(12) United States Patent
Chen

(10) Patent No.: US 11,092,279 B2
(45) Date of Patent: Aug. 17, 2021

(54) FOLDABLE DEVICE AND FOLDABLE FAN AND FOLDABLE TABLE LAMP APPLICABLE THERETO

(71) Applicant: SHENZHEN ADYSS TECHNOLOGY CO., LTD., Guangdong (CN)

(72) Inventor: Weihao Chen, Guangdong (CN)

(73) Assignee: SHENZHEN DIEPIN TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 16/727,659

(22) Filed: Dec. 26, 2019

(65) Prior Publication Data

US 2020/0240578 A1    Jul. 30, 2020

(30) Foreign Application Priority Data

Jan. 25, 2019  (CN) ........................ 201920128399.X
Jan. 25, 2019  (CN) ......................... 201920128836.8
(Continued)

(51) Int. Cl.
*F16M 11/28* (2006.01)
*F04D 29/64* (2006.01)
(Continued)

(52) U.S. Cl.
CPC ........... *F16M 11/28* (2013.01); *F04D 29/646* (2013.01); *F16M 11/2021* (2013.01);
(Continued)

(58) Field of Classification Search
USPC ..................................................... 248/346.3
See application file for complete search history.

(56) References Cited

U.S. PATENT DOCUMENTS 5,169,226 A    12/1992  Freidman
5,695,271 A *  12/1997  Zeller .................... F21V 21/22
                                                362/191
(Continued)

FOREIGN PATENT DOCUMENTS

CN    2605439 Y    3/2004
CN    2606236 Y    3/2004
(Continued)

OTHER PUBLICATIONS

European Patent Office, European patent search report dated Jun. 29, 2020, for corresponding European patent application 19220158.0.

*Primary Examiner* — Monica E Millner
(74) *Attorney, Agent, or Firm* — Li & Cai Intellectual Property (USA) Office

(57) ABSTRACT

A foldable device and a foldable fan and a foldable table lamp applicable thereto are provided. The foldable device comprises: a chassis for supporting an electronic device or a small electric device, and a telescopic mechanism of which one end is assembled with the chassis and the other end is assembled with an electronic device or a small electric device. The telescopic mechanism is telescoped to adjust the support height during use, and the telescopic mechanism is retractably received in the chassis during receiving. The foldable device adopting the above technical solution has a simple and compact structure, and the foldable device is mainly applied to an electronic product or a small electric device that needs to be folded and received, and the folded electronic product has a small body shape, which does not occupy space and is easy to be received.

77 Claims, 18 Drawing Sheets

(30) Foreign Application Priority Data

| Aug. 16, 2019 | (CN) | 201910759811.2 |
|---|---|---|
| Aug. 16, 2019 | (CN) | 201910759824.X |
| Aug. 16, 2019 | (CN) | 201921339116.2 |
| Aug. 16, 2019 | (CN) | 201921339803.4 |

(51) Int. Cl.
- *F16M 11/20* (2006.01)
- *F21S 6/00* (2006.01)
- *F21V 21/22* (2006.01)
- *F21V 21/26* (2006.01)

(52) U.S. Cl.
CPC .............. *F21S 6/002* (2013.01); *F21V 21/22* (2013.01); *F21V 21/26* (2013.01); *F16M 2200/028* (2013.01); *F16M 2200/068* (2013.01); *F16M 2200/08* (2013.01)

(56) References Cited

U.S. PATENT DOCUMENTS

| 6,962,314 | B2 |   | 11/2005 | Hsu |   |
|---|---|---|---|---|---|
| 7,017,871 | B2 | * | 3/2006 | Chen | F04D 29/601 248/161 |
| 7,090,378 | B1 | * | 8/2006 | Zadro | A45D 42/10 362/109 |
| 7,494,104 | B2 | * | 2/2009 | Baek | F16C 11/10 248/284.1 |
| 9,981,723 | B2 | * | 5/2018 | Corley | H02J 7/342 |
| 2003/0179572 | A1 | * | 9/2003 | Schnell | F21V 21/26 362/191 |
| 2004/0149869 | A1 |   | 8/2004 | Chen |   |
| 2009/0107269 | A1 |   | 4/2009 | Prichard |   |
| 2017/0164719 | A1 | * | 6/2017 | Wheeler | A45D 42/16 |

FOREIGN PATENT DOCUMENTS

| CN | 200971866 U | 11/2007 |
|---|---|---|
| CN | 201133576 Y | 10/2008 |
| CN | 201650788 U | 11/2010 |
| CN | 202191251 U | 4/2012 |
| CN | 202579235 U | 12/2012 |
| CN | 202706662 U | 1/2013 |
| CN | 202800910 U | 3/2013 |
| CN | 103094960 A | 5/2013 |
| CN | 203099635 U | 7/2013 |
| CN | 203548264 U | 4/2014 |
| CN | 203560731 U | 4/2014 |
| CN | 204678006 U | 9/2015 |
| CN | 204827969 U | 12/2015 |
| CN | 106015041 A | 10/2016 |
| CN | 205716605 U | 11/2016 |
| CN | 106534608 A | 3/2017 |
| CN | 206144815 U | 5/2017 |
| CN | 206234144 U | 6/2017 |
| CN | 206290933 U | 6/2017 |
| CN | 206409419 U | 8/2017 |
| CN | 107302606 A | 10/2017 |
| CN | 104912820 B | 1/2018 |
| CN | 206846320 U | 1/2018 |
| CN | 206929101 U | 1/2018 |
| CN | 108240349 A | 7/2018 |
| CN | 207612325 U | 7/2018 |
| CN | 207795605 U | 8/2018 |
| CN | 207961000 U | 10/2018 |
| CN | 208222165 U | 12/2018 |
| CN | 208281214 U | 12/2018 |
| CN | 110469793 A | 11/2019 |
| CN | 110486600 A | 11/2019 |
| CN | 210152994 U | 3/2020 |
| DE | 10340342 A1 | 3/2005 |
| JP | 47-39644 | 11/1972 |
| JP | S4728354 U | 11/1972 |
| JP | S4811400 Y1 | 3/1973 |
| JP | S52129583 U | 10/1977 |
| JP | 2002188593 A | 7/2002 |
| JP | 3532562 B2 | 5/2004 |
| JP | 4791790 B2 | 10/2011 |
| WO | WO 2013159324 A | 10/2013 |
| WO | WO 2015131882 A2 | 9/2015 |

* cited by examiner

US 11,092,279 B2

FOLDABLE DEVICE AND FOLDABLE FAN AND FOLDABLE TABLE LAMP APPLICABLE THERETO

FIELD OF THE DISCLOSURE

The present disclosure relates to the field of foldable device technology, and in particular to a foldable device and a foldable fan and a foldable table lamp applicable thereto.

BACKGROUND OF THE DISCLOSURE

At present, various electronic products (such as fans, table lamps, fill lamps, etc.) appear on the market. Some electronic products are not conducive to packaging and transportation due to their large size, and some products need to be folded and received during use. Foldable devices can reduce the occupation of the space and is convenient to carry, and therefore, the foldable device can realize the function of folding and storing the above products.

However, the foldable device of the prior art can only perform simple folding, has a relatively simple function and a limited application range, and lacks the telescopic and storage function.

SUMMARY OF THE DISCLOSURE

In view of the defects and deficiencies of the prior art, one object of the present disclosure is to provide a foldable device, which is simple and compact in structure, and the foldable device is mainly applied to an electronic product or a small electric power that needs to be folded and received. On the device, the folded electronic product has a small body shape, which does not occupy space, and is easy to receive and convenient to carry, thereby widening the application range of the foldable device, facilitating market promotion, having convenient folding, convenient storage, and good portability. The folding operation is simple, the packaging material and the packaging volume are reduced, and the transportation cost is saved.

In order to achieve the above object, the technical solution adopted by the present disclosure is as follows.

A foldable device is provided, comprising: a chassis configured to support an electronic device or a small electric device; and a telescopic mechanism of which one end is assembled with the chassis and the other end is assembled with an electronic device or a small electric device; wherein the telescopic mechanism is telescoped to adjust the support height during use, and the telescopic mechanism is retractably received in the chassis during receiving; wherein the chassis is provided with a receiving groove, the telescopic mechanism is rotatably mounted in the receiving groove, and a locking mechanism is disposed between the telescopic mechanism and the receiving groove; the locking mechanism is configured to lock the telescopic mechanism with the chassis when the telescopic mechanism is used; when the telescopic mechanism is received, the locking mechanism releases the lock between the telescopic mechanism and the chassis, and after unlocking, the telescopic mechanism is inverted with respect to the chassis and received in the receiving groove.

The receiving groove is disposed on a bottom surface of the chassis, and/or on the electronic device or the small electric device; and one end of the telescopic mechanism is hinged to one end of the receiving groove; when the telescopic mechanism is received, the telescopic mechanism is flipped over the hinge end to the receiving groove of the bottom surface of the chassis from the working state of the upper side of the chassis; alternatively, the receiving groove is disposed on a top surface of the chassis, and/or on the electronic device or the small electric device; and one end of the telescopic mechanism is hinged at one end of the receiving groove; when the telescopic mechanism is received, the telescopic mechanism is flipped over the hinge end to the receiving groove of the top surface of the chassis from the working state of the upper side of the chassis.

The telescopic mechanism comprises: an inner sleeve that rotates the hinge end with the chassis; and a telescopic rod; wherein a fixed end of the telescopic rod is sleeved in and fixedly assembled with the inner sleeve and a telescopic end of the telescopic rod is assembled with an electronic device or a small electric device.

Two sides of the hinge end of the inner sleeve respectively extend outward to form a rotating shaft, and two of the rotating shafts are disposed on the same axis; the chassis is provided with an storage space, and an inner wall surface on one side of the storage space is provided with a mounting boss; the mounting boss is respectively provided with a mounting shaft hole corresponding to the two rotating shafts, the size of the mounting shaft hole is matched with the size of the two rotating shafts, and the two rotating shafts are respectively inserted into the mounting shaft hole, so that the inner sleeve is rotatably mounted on the mounting boss through the rotating shaft.

The locking mechanism comprises: an outer sleeve sleeved on the inner sleeve and rotatable relative to the inner sleeve to lock or unlock the inner sleeve and the chassis, and a limiting structure disposed between the inner sleeve and the outer sleeve for limiting a movement of the outer sleeve on the inner sleeve.

A locking member is provided between the outer sleeve and the chassis, and the locking member is configured to increase the locking area between the outer sleeve and the chassis to improve the stability of the telescopic rod; wherein when the outer sleeve is rotated relative to the inner sleeve and close to the chassis, the outer sleeve abuts the locking member against the chassis to lock the inner sleeve; and wherein when the outer sleeve is rotated relative to the inner sleeve and away from the chassis, the outer sleeve releases the abutment of the locking member to unlock the inner sleeve.

An outer surface of the inner sleeve is provided with an external thread, an inner surface of the outer sleeve is provided with a corresponding internal thread, and the outer sleeve is locked and fixed to the inner sleeve by a threaded structure cooperating with the inner sleeve.

An outer circumference of the rotating shaft is further provided with a damping pad for increasing frictional force, and the damping pad is interposed between the rotating shaft and the mounting shaft hole of the mounting boss.

The limiting structure is provided between the outer sleeve and the telescopic rod, and comprises: a holding ring and a locking ring; wherein the holding ring is sleeved on one side of the inner sleeve away from the hinge end, engaged with the inner sleeve and provided with an opening; wherein one part of the locking ring is inserted into the inner sleeve through the opening of the holding ring and the other part is engaged with the holding ring.

The locking mechanism comprises: a fixing head, a fixing piece, an adjusting piece, and an adjustment bolt; wherein the rotating shaft is provided with an assembling cavity, the fixing head is fixedly fitted in the assembling cavity, and the fixing head moves synchronously with the rotating shaft; wherein one end of the fixing piece is fixedly mounted on the chassis; wherein the adjusting piece is disposed between the fixing piece and the fixing head, and/or between the fixing piece and the adjusting bolt; and wherein the adjusting bolt is assembled with the fixing piece and the fixing head through the adjusting piece, and is configured to adjust the frictional force between the fixing piece and the fixing head.

After adopting the above technical solution, the beneficial effect of the present disclosure is that the support height of the telescopic mechanism of the foldable device can be freely adjusted when used, so as to simultaneously meet the requirements of different support heights of desktop products and ground products. When received, the telescopic mechanism of the foldable device can be contracted and received on the chassis after being contracted, thereby realizing the folding function, and the foldable device can effectively ensure the stable locking of the telescopic mechanism when the locking mechanism is in use. The present disclosure has the advantages of simple and compact structure, and is mainly applied to an electronic product or a small electric device which needs to be folded and received, and the folded electronic product has a small body shape, which does not occupy a space, is easy to be received, and is convenient to carry, thereby widening the application range of the foldable device, facilitating market promotion, having convenient folding, convenient storage, good portability, and the simple folding operation.

Aiming at the defects and deficiencies of the prior art, another object of the present disclosure is to provide a foldable fan, which has a compact structure; wherein the fan main body can be adjusted at multiple angles, is easy to fold and receive, and has a small volume after being folded. Further, the wind angle is well adjusted, the folding is convenient, the storage is convenient, and the portability is good.

In order to achieve the above object, the technical solution adopted by the present disclosure is: a foldable fan, comprising: a foldable device as described above; a fan main body disposed on a side of the foldable device away from the chassis; and a flip-locking mechanism of which one end is assembled with the fan main body and the other end is mounted on a side of the foldable device away from the chassis; wherein when the fan main body is used, the flip-locking mechanism is configured to achieve locking between the fan main body and the foldable device, or when the fan main body is received, the flip-locking mechanism is configured to implement the rotation between the fan main body and the foldable device.

The flip-locking mechanism comprises: a first connecting base fixedly mounted on the fan main body; a first gimbal head fixedly mounted on one side of the telescopic locking mechanism away from the chassis and configured to assemble with the first connecting base; a hinge member of which one end is assembled with the first connecting base and the other end is assembled with the first gimbal head for realizing a rotational assembly between the first gimbal head and the first connecting base; and a damping rubber ring disposed between the hinge member and the first gimbal head.

The first connecting base is provided with a notch of a "⊏" type structure, two hinge members are provided and are respectively mounted on opposite inner wall surfaces of the notch, one end of the first gimbal head has an annular shape and is hinged to the two hinge members, and the other end of the first gimbal head is fixedly assembled with the telescopic locking mechanism; and when the fan main body is received, the fan main body is folded over relative to the telescopic locking mechanism by the first gimbal head.

After adopting the above technical solution, the present disclosure has the beneficial effects that the fan main body can realize the functions of flip folding and multi-angle adjustment by flipping over the locking mechanism by providing the flip-locking mechanism on the fan main body. Moreover, the fan main body is further connected with a telescopic locking mechanism, and the telescopic locking mechanism can realize the telescopic locking function. The structure of the present disclosure is simple and compact, the fan main body can be folded on the chassis by the flip-locking mechanism and the telescopic locking mechanism, and the fan shape is small after folding, which does not occupy space, and is easy to receive and convenient to carry.

Aiming at the defects and deficiencies of the prior art, yet another object of the present disclosure is to provide a foldable table lamp. The structure of the table lamp is compact, the main body of the table lamp can be adjusted at multiple angles, and the foldable table lamp is easy to fold and convenient to store, and has good portability.

In order to achieve the above object, the technical solution adopted by the present disclosure is: a foldable table lamp, comprising: the aforementioned foldable device; a table lamp main body provided on one side of the foldable device; wherein the table lamp main body is foldable and received on one side of the foldable device; and a flip-locking mechanism of which one end is assembled with the table lamp main body and the other end is mounted on a telescopic end; wherein when the table lamp main body is used, the flip-locking mechanism is configured to achieve locking between a fan main body and the telescopic end, or when the table lamp main body is received, the flip-locking mechanism is configured to implement the rotation between the table lamp main body and the telescopic end.

The flip-lock mechanism comprises: a second connecting base mounted on one side of the table lamp main body close to the telescopic rod; wherein a mounting cavity and a mounting gap are provided on the second connecting base; a mounting base provided at the telescopic end of the telescopic rod and fixedly assembled with the telescopic rod; wherein a circular hole is provided on the mounting base along the axial direction of the telescopic rod; a second gimbal head of which one end is inserted into the circular hole and damped and rotatable relative to the telescopic rod and the other end is inserted into the mounting gap and damped and rotatable opposite to the second connecting base; a mounting chuck provided in the mounting cavity and damped and assembled with the second gimbal head; and a compaction block inserted into the mounting cavity and configured to fix the mounting clamp and protect conducting wires.

The circular hole is configured to damp the second gimbal head, a first limiting block is provided in the circular hole, a side of the second gimbal head close to the circular hole is provided with a limiting ring assembled with the first limiting block, a yielding slot is provided on the limiting ring and configured to cooperate with the first limiting block; wherein a limiting boss is protruded on an inner ring of the limiting ring, a second limiting block is arranged on the second gimbal head, the second limiting block is configured to cooperate with the limiting boss to achieve a limit position the second gimbal head and the limiting ring; and wherein when the second gimbal head rotates relative to the telescopic rod, the cooperation of the first limiting block and the limiting ring and the cooperation of the second limiting block and the limiting boss effectively prevent the second gimbal head from rotating excessively, so as to protect spring wire installed in the telescopic rod.

After adopting the above technical solution, the present disclosure has the beneficial effect that: by providing the flip-lock mechanism on the table lamp main body, the table lamp main body can realize the functions of flip and fold and multi-directional adjustment of the lighting direction through the flip-lock mechanism, which greatly improves the adjustment range of the table lamp main body. The present disclosure has the advantages of convenient adjustment of the table lamp main body, good adjustment feel, large adjustment range, various adjustment methods, and high stability after adjustment. In addition, the main body of the table lamp is also connected with a telescopic locking mechanism, and the telescopic locking mechanism can realize the telescopic locking function. The structure of the present disclosure is simple and compact. The main body of the table lamp can be folded on the chassis through the flip-lock mechanism and the telescopic locking mechanism. The volume of the folded table lamp becomes smaller, occupying no space, easy to store, and convenient to carry.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. Obviously, the drawings in the following description are only a certain embodiment of the present disclosure, and other drawings can be obtained from those skilled in the art without any inventive labor.

Figure 1:
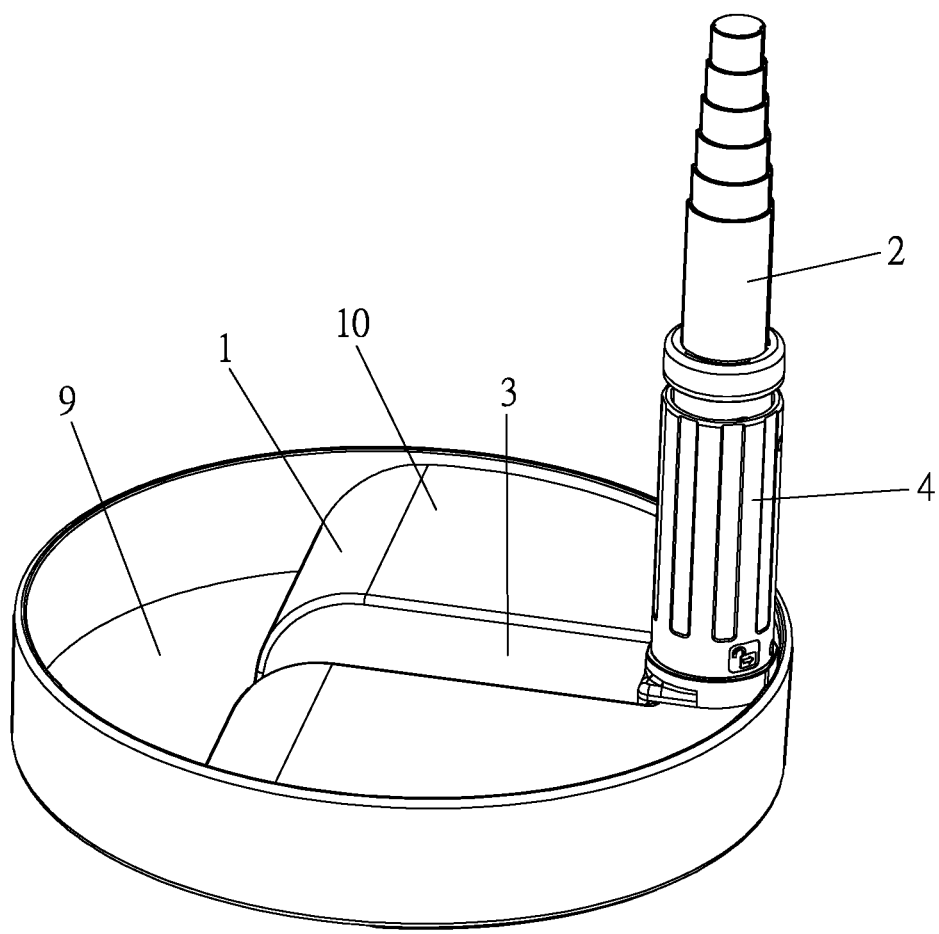
FIG. 1 is a schematic view showing the first overall structural view of Embodiment 1.
Figure 2:
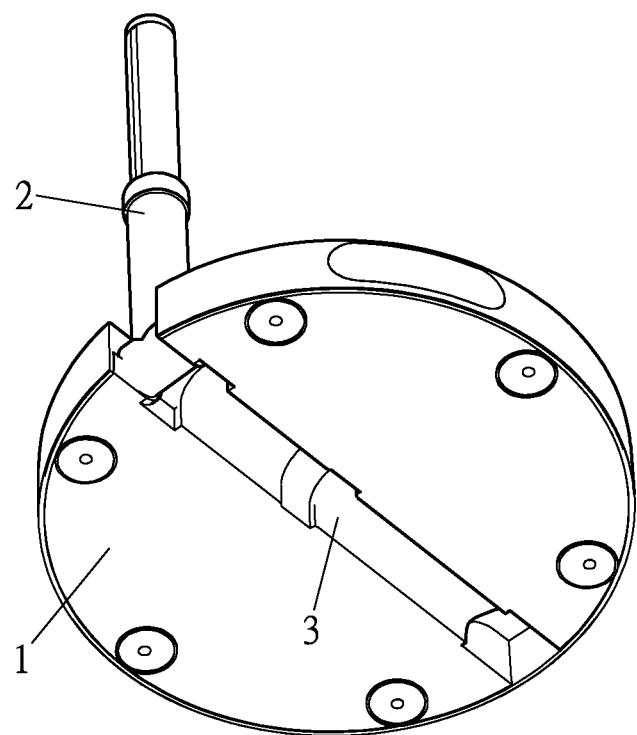
FIG. 2 is a schematic view showing the second overall structure of Embodiment 1.
Figure 3:
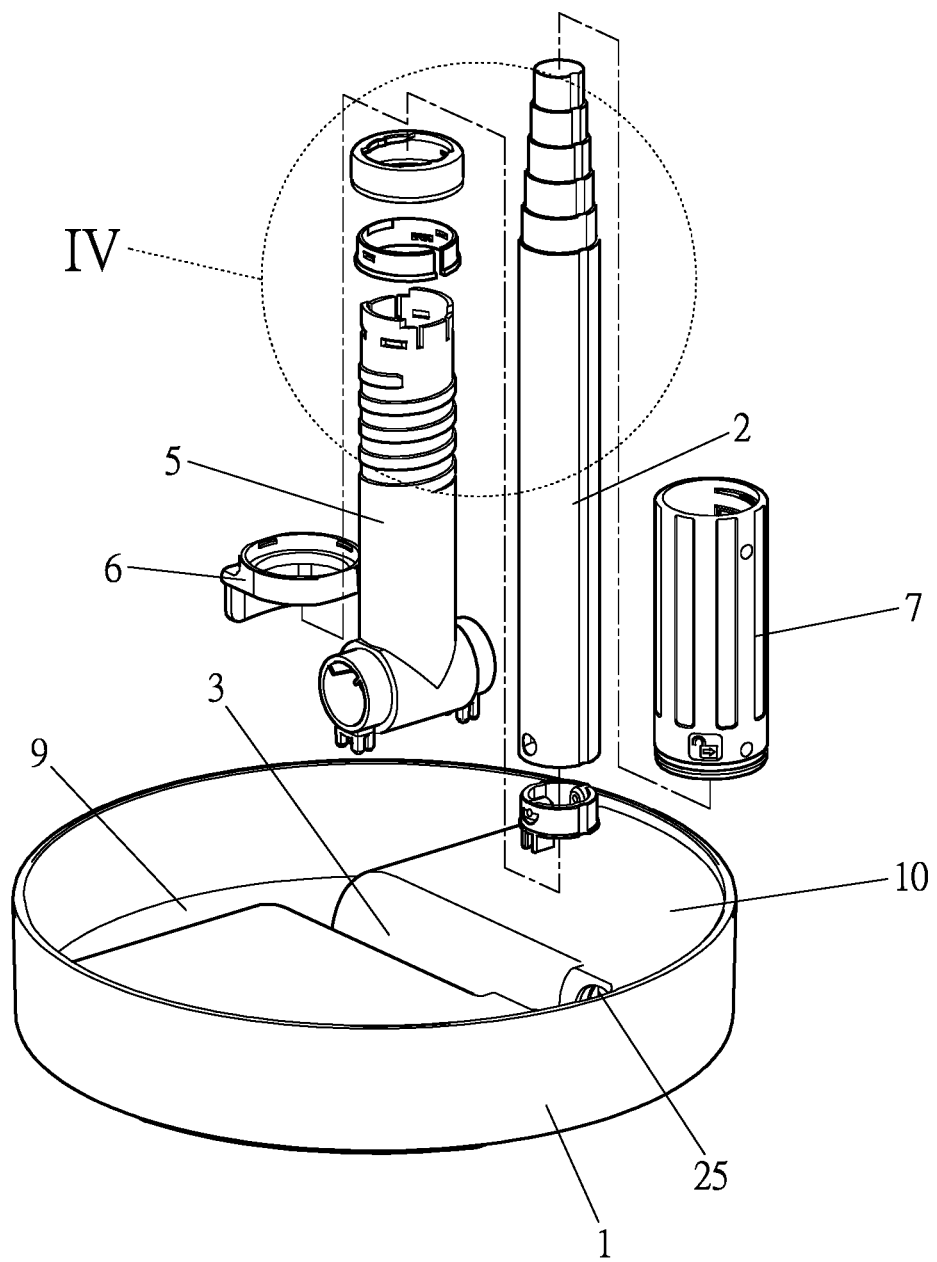
FIG. 3 is an exploded view of the overall structure of Embodiment 1.
Figure 4:
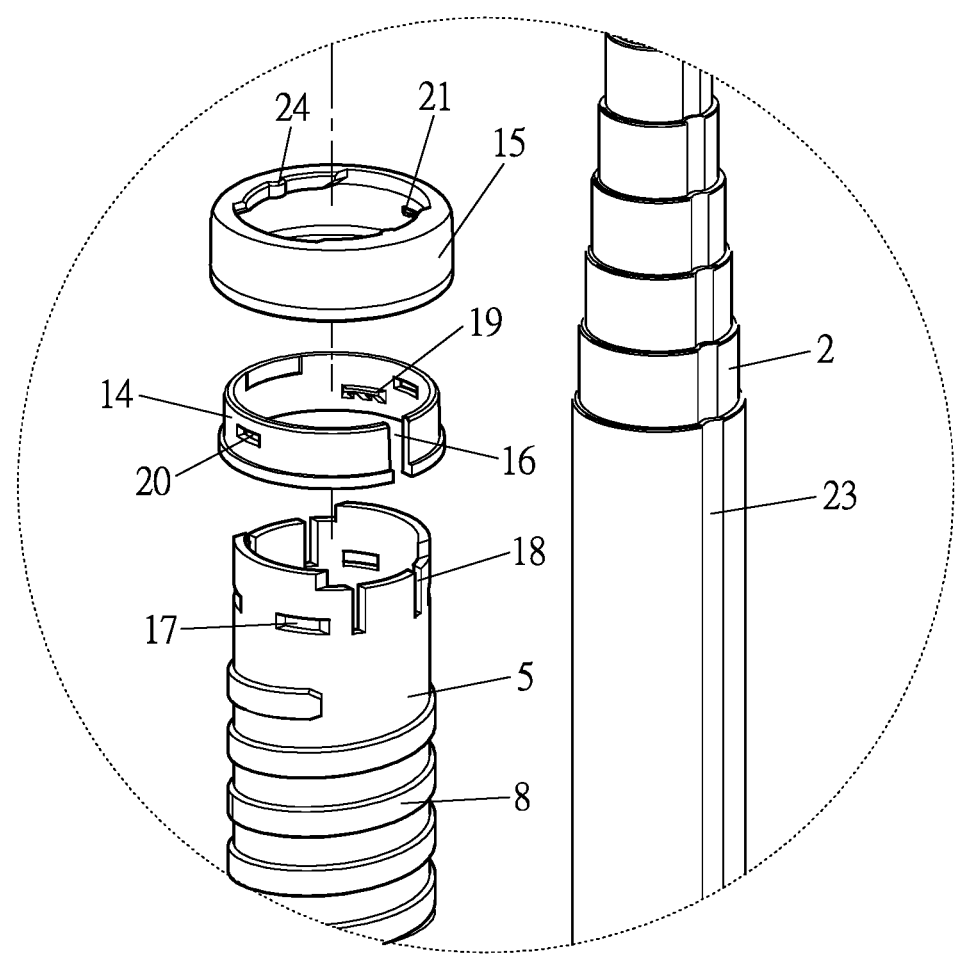
FIG. 4 is a partial enlarged view corresponding to detail IV of FIG. 3.
Figure 5:
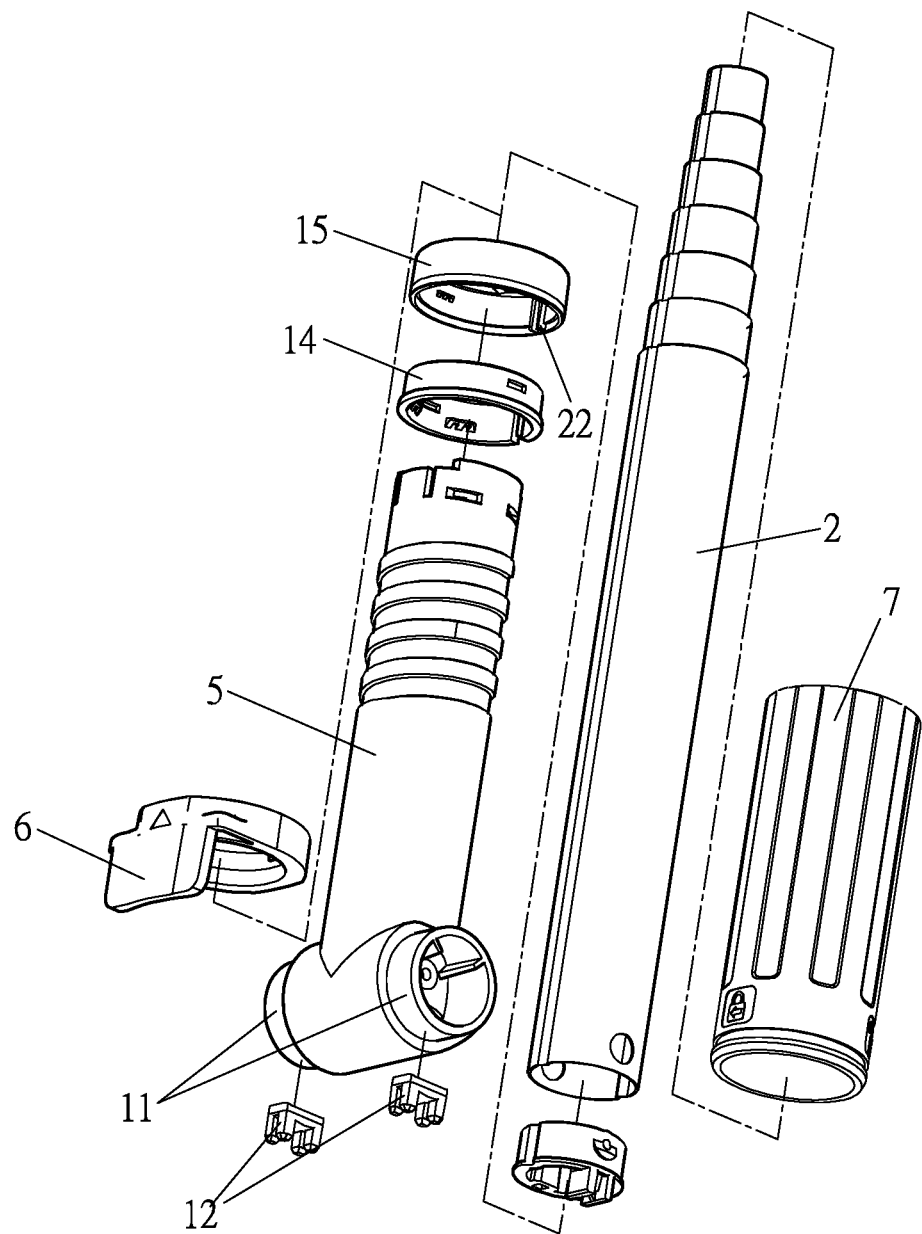
FIG. 5 is an exploded view of the embodiment 1 after removing the chassis.

Reference numeral: 1, chassis; 2, telescopic mechanism; 3, receiving groove; 4, locking mechanism; 5, inner sleeve; 6, locking member; 7, outer sleeve; 8, external thread; 9, a storage space; 10, mounting boss; 11, rotating shaft; 12, damping pad; 13, limiting structure; 14, holding ring; 15, locking ring; 16, opening; 17, first locking hole; 18, insertion slot; 19, first lock block; 20, second lock hole; 21, second lock block; 22, insertion block; 23, arcuate groove; 24, arcuate protrusion; 25, mounting shaft hole; 26, sleeve; 27, mounting groove; 28, fixing head; 29, fixing piece; 30, adjusting bolt; 31, adjusting piece; 32, assembling cavity; 33, fan main body; 34, flip-locking mechanism; 35, cover; 36, rear cover; 37, motor; 38, fan blade; 39, operating button; 40, first connecting base; 41, first gimbal head; 42, hinge member; 43, damping rubber ring; 44, notch; 45, circular through hole; 46, circular protrusion; 47, insertion assembly; 48, insertion groove; 49, fixed block; 50, insertion board; 51, shifting block; 52, elastic member; 53, mounting table; 54, first boss; 55, second boss; 56, mounting piece; 57, waist-shaped groove; 58, table lamp main body; 59, second connecting base; 60, mounting base; 61, mounting chuck; 62, compaction block; 63, mounting gap; 64, circular hole; 65, first limiting block; 66, limiting ring; 67, yielding slot; 68, sealing ring; 69, mounting hole; 70, mounting portion; 71, sliding groove; 72, sliding rail; 73, wire groove; 74, ladder structure; 75, second gimbal head; 76, circuit board; 77, mobile power source; 78, power socket; 79, limiting boss; 80, second limiting block.

DETAILED DESCRIPTION OF THE EXEMPLARY EMBODIMENTS

The present disclosure will be further described in detail below with reference to the accompanying drawings.

The embodiments are only an explanation of the present disclosure, and are not intended to limit the present disclosure. Those skilled in the art can make modifications that do not contribute to the present embodiment as needed after reading the present specification, but as long as the present disclosure is in the right of the present disclosure; all requirements are protected by the patent law.

Embodiment 1

The embodiment relates to a foldable device with telescopic and storage function for, which is mainly used for an electronic device or a small electric device (for example, a fan, a table lamp, etc.). As shown in FIGS. 1-5, the foldable device includes a chassis 1 and a telescopic mechanism 2.

The chassis 1 is used to support an electronic device or a small electric device. One end of the telescopic mechanism 2 is assembled with the chassis 1 and the other end is assembled with an electronic device or a small electric device. In use, the telescopic mechanism 2 can be telescoped to adjust the support height; and during receiving, the telescopic mechanism 2 can be retractably received in the chassis 1.

It should be noted that, as shown in FIGS. 1-5, the chassis 1 is provided with a receiving groove 3, the telescopic mechanism 2 is rotatably mounted in the receiving groove 3, and a locking mechanism 4 is provided between the telescopic mechanism 2 and the receiving groove 3. When the telescopic mechanism 2 is used, the locking mechanism 4 is used to lock the telescopic mechanism 2 and the chassis 1; and when the telescopic mechanism 2 is received, the locking mechanism 4 releases the locking between the telescopic mechanism 2 and the chassis 1; and after unlocking, the telescopic mechanism 2 is inverted with respect to the chassis 1 and received in the receiving groove 3. In other embodiments, the receiving groove 3 is provided on an electronic device or a small electric device (as shown in FIG.

13); or, a part of the receiving groove 3 is provided on the chassis 1 and the other part is provided on the electronic device or the small electric device.

Further, as shown in FIGS. 1-5, the telescopic mechanism 2 includes an inner sleeve 5 and a telescopic rod. The hinge end of the inner sleeve 5 is rotatably assembled with the chassis 1. The fixed end of the telescopic rod is sleeved in the inner sleeve 5 and fixedly assembled with the inner sleeve 5. The telescopic end of the telescopic rod is assembled with an electronic device or a small electric device.

Specifically, the two sides of the hinge end of the inner sleeve 5 respectively extend outward to form a rotating shaft 11, and the two rotating shafts 11 are disposed on the same axis. A storage space 9 is disposed on the chassis 1, and a mounting boss 10 is disposed on an inner wall surface of the storage space 9. The mounting boss 10 is respectively provided with a mounting shaft hole 25 at a position corresponding to the two rotating shafts 11. The size of the mounting shaft hole 25 is matched with the size of the two rotating shafts 11, and the two rotating shafts 11 are respectively inserted into the mounting shaft hole 25, so that the inner sleeve 5 can be rotatably mounted on the mounting boss 10 by the rotating shaft 11.

The locking mechanism 4 includes a locking member 6, an outer sleeve 7, and a limiting structure 13. The outer sleeve 7 is sleeved on the inner sleeve 5 and is rotatable relative to the inner sleeve 5 to lock or unlock the inner sleeve 5 and the chassis 1. The limiting structure 13 is disposed between the inner sleeve 5 and the outer sleeve 7, and is used for limiting the movement of the outer sleeve 7 on the inner sleeve 5. The locking member 6 is sleeved on the inner sleeve 5 and is located at the hinge end of the inner sleeve 5.

It should be noted that when the outer sleeve 7 rotates relative to the inner sleeve 5 and is close to the chassis 1, the outer sleeve 7 abuts the locking member 6 against the chassis 1 to lock the inner sleeve 5; when the outer sleeve 7 is rotated relative to the inner sleeve 5 and away from the chassis 1, the outer sleeve 7 releases the abutment of the locking member 6 to release the locking of the inner sleeve 5.

Specifically, as shown in FIGS. 1-5, the outer surface of the inner sleeve 5 is provided with an external thread 8, and the inner surface of the outer sleeve 7 is provided with a corresponding internal thread. The outer sleeve 7 can be locked and fixed to the inner sleeve 5 by a threaded structure that cooperates with the inner sleeve 5. Since the inner sleeve 5 is sleeved with the locking member 6, when the outer sleeve 7 drives the locking member 6 against the mounting boss 10, the outer sleeve 7, the inner sleeve 5 and the telescopic rod are fixed relative to the chassis 1.

Preferably, as shown in FIG. 1-5, the outer circumference of the rotating shaft 11 is further provided with a damping pad 12 for increasing the frictional force. The damping pad 12 is clamped between the rotating shaft 11 and the mounting shaft hole 25 of the mounting boss 10.

As shown in FIG. 1-5, the limiting structure 13 includes a holding ring 14 and a locking ring 15. The holding ring 14 is sleeved on one side of the inner sleeve 5 away from the hinge end, and the holding ring 14 is engaged with the inner sleeve 5 and provided with an opening 16. A part of the locking ring 15 is inserted into the inner sleeve 5 through the opening 16 of the holding ring 14, and the other part is engaged with the holding ring 14.

Specifically, as shown in FIGS. 1-5, the upper end of the inner sleeve 5 is provided with a first lock hole 17 and an insertion slot 18, and the first lock block 19 is disposed on the holding ring 14. When the holding ring 14 is assembled with the inner sleeve 5, the first locking block 19 is assembled with the first locking hole 17 to achieve the assembly between the holding ring 14 and the inner sleeve 5. A second lock hole 20 is provided in the holding ring 14, and a second lock block 21 and an insertion block 22 are protruded from the inner wall of the locking ring 1 and disposed thereon. When the locking ring 15 and the holding ring 14 are assembled, the insertion block 22 passes through the opening 16 and cooperates with the second lock hole 20 through the second lock block 21 to achieve the assembly between the locking ring 15 and the locking ring 14.

Preferably, as shown in FIG. 1-5, the telescopic rod is provided with an arcuate groove 23, the locking ring 15 is provided with an arcuate protrusion 24, and the arcuate protrusion 24 is matched with the arcuate groove 23 to ensure the tight fit between the telescopic rod and the locking ring 15. Since the locking ring 15 is tightly fitted to the inner sleeve 5 by the holding ring 14, a tight fit between the telescopic rod and the inner sleeve 5 is ensured.

The working principle of the embodiment is substantially as follows. When the foldable device is opened, the telescopic rod is first pulled upward by an external force, so that the telescopic rod drives the inner sleeve 5, the outer sleeve 7, the limiting structure 13 and the locking member 6 to rotate upward around the rotating shaft 11 until the telescopic rod is perpendicular to the chassis 1, and then the outer sleeve 7 is rotated, so that the outer sleeve 7 drives the locking member 6 to abut against the mounting boss 10, thereby locking the telescopic rod in a vertical position to complete the opening of the foldable device. The disclosed manner has the advantages of convenient folding, convenient storage, good portability, simple folding operation, reducing packaging materials and packaging volume, and saving transportation cost.

Embodiment 2

Figure 6:
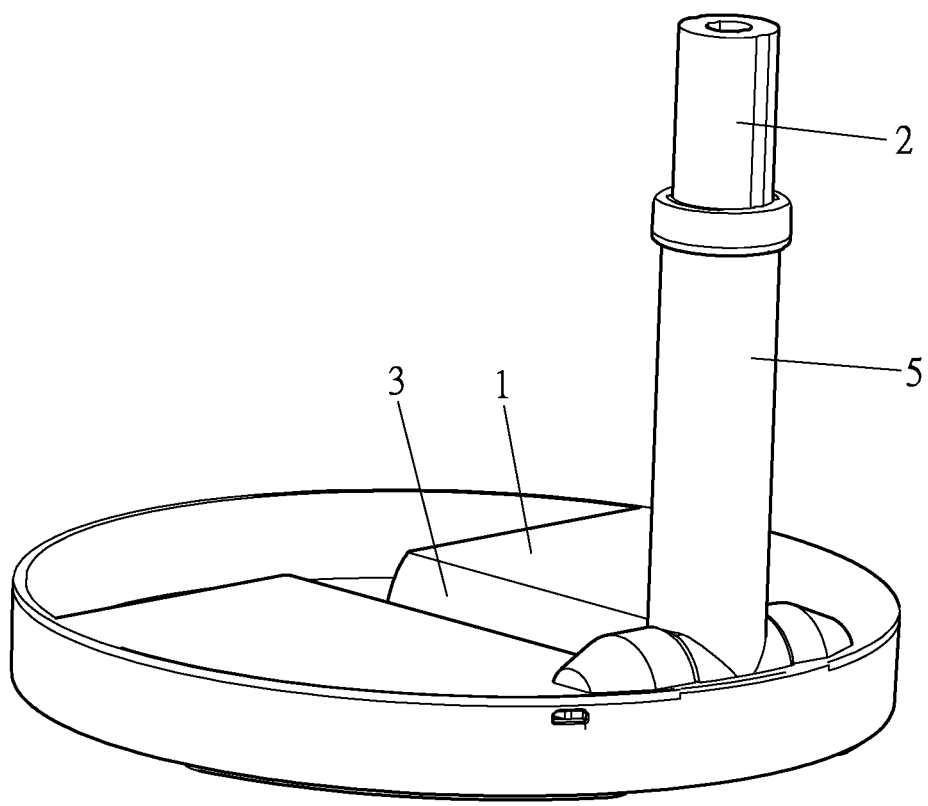
FIG. 6 is a schematic view showing the overall structure of Embodiment 2.
Figure 7:
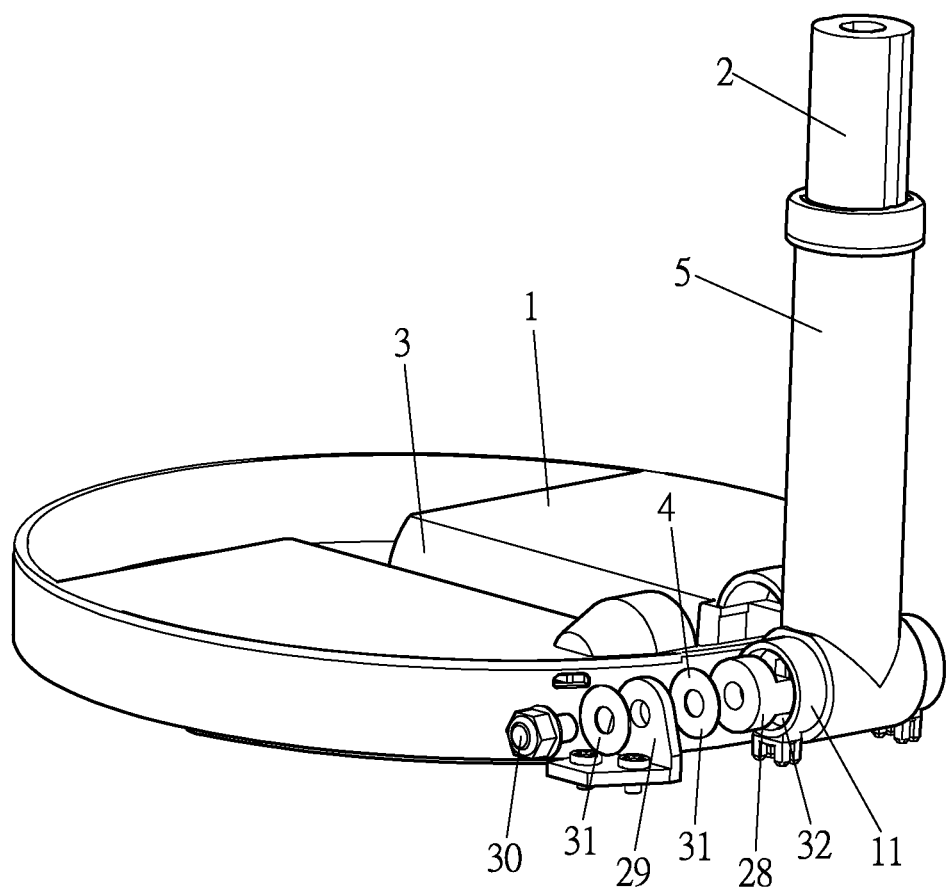
FIG. 7 is an exploded view of Embodiment 2.

The difference between this embodiment and Embodiment 1 is mainly that, as shown in FIGS. 6 and 7, in the present embodiment, the locking mechanism 4 includes a fixing head 28, a fixing piece 29, an adjusting bolt 30, and an adjusting piece 31. The rotating shaft 11 is provided with an assembling cavity 32, and the fixing head 28 is fixedly fitted in the assembling cavity 32 and movable synchronously with the rotating shaft 11. One end of the fixing piece 29 is fixedly mounted on the chassis 1, and the fixing piece 29 is for fixing the other end of the damper to the chassis 1. The adjusting piece 31 is disposed between the fixing piece 29 and the fixing head 28, and/or between the fixing piece 29 and the adjusting bolt 30. The adjusting bolt 30 is threadedly fitted to the fixing head 28 through the adjusting piece 31 and the fixing piece 29 for adjusting the frictional force between the fixing piece 29 and the fixing head 28.

In the present embodiment, the adjusting piece 31 is provided with two pieces, one of which is located between the fixing piece 29 and the fixing head 28, and the other piece is located between the fixing piece 29 and the adjusting bolt 30.

Preferably, a mounting table is disposed on an inner side wall of the chassis 1 adjacent to the receiving groove 3, and the fixing piece 29 is fixedly mounted on the mounting table by two fastening screws. The other end of the rotating shaft 11 is provided with a wire through hole through which the spring wire in the telescopic rod passes.

Embodiment 3

Figure 8:
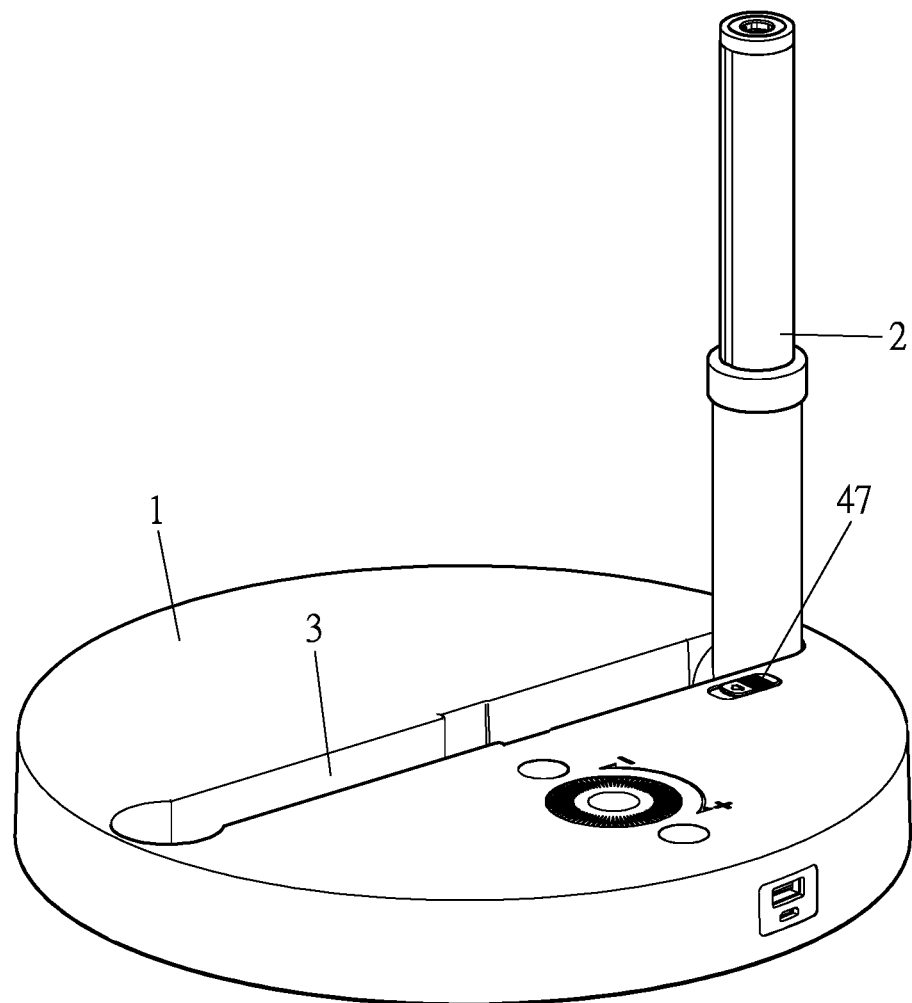
FIG. 8 is a schematic view showing the overall structure of Embodiment 3.
Figure 9:
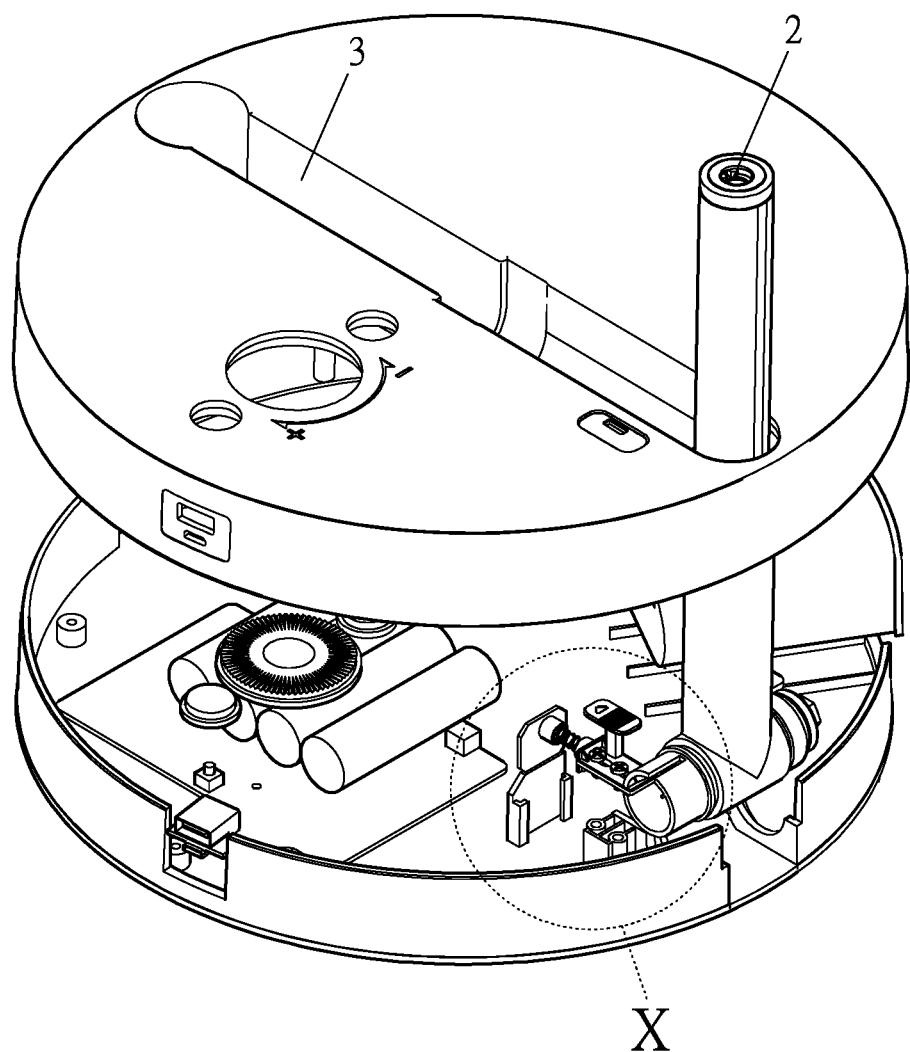
FIG. 9 is an exploded view of Embodiment 3.
Figure 10:
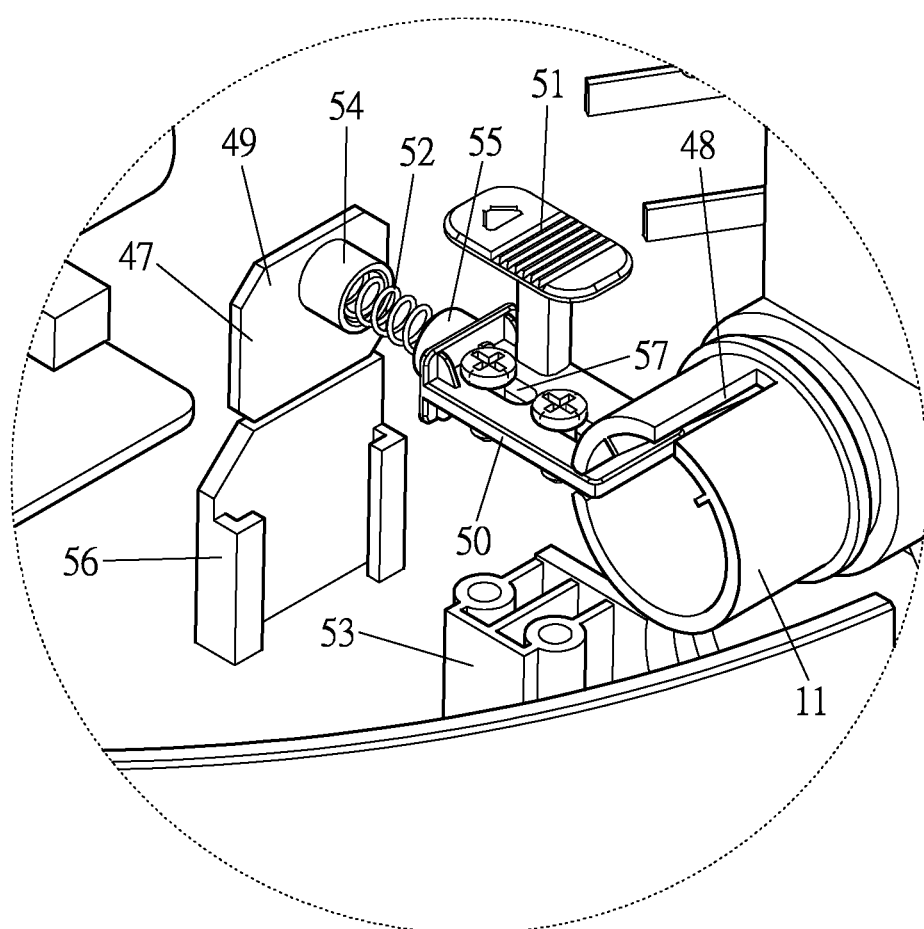
FIG. 10 is a partial enlarged view corresponding to detail X of FIG. 9.

The difference between the embodiment and Embodiment 1 and Embodiment 2 is that, as shown in FIG. 8-10, in the present embodiment, the rotating shaft 11 is provided with an insertion groove 48, and the locking mechanism 4 is disposed on the chassis 1. The insertion assembly 47 is configured to cooperate with the insertion groove 48 to fix the inner sleeve 5, thereby maintaining the telescopic rod and the chassis 1 relatively fixed.

Figure 11:
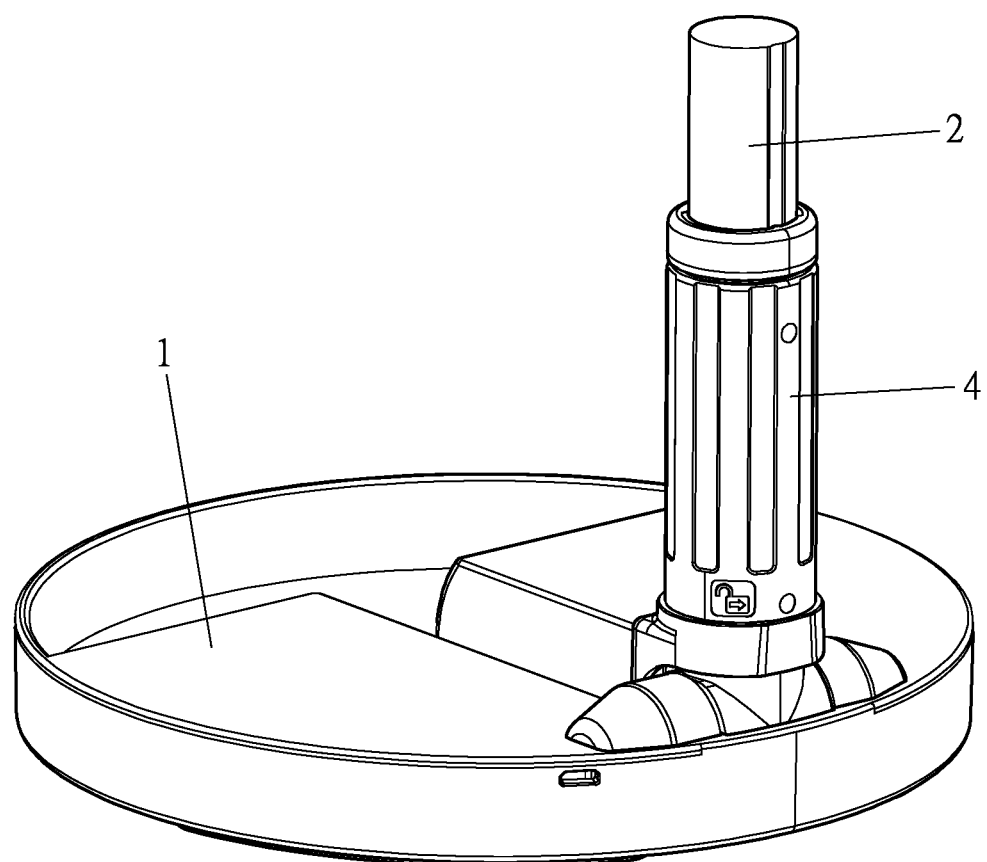
FIG. 11 is a schematic view showing the overall structure of Embodiment 3.
Figure 12:
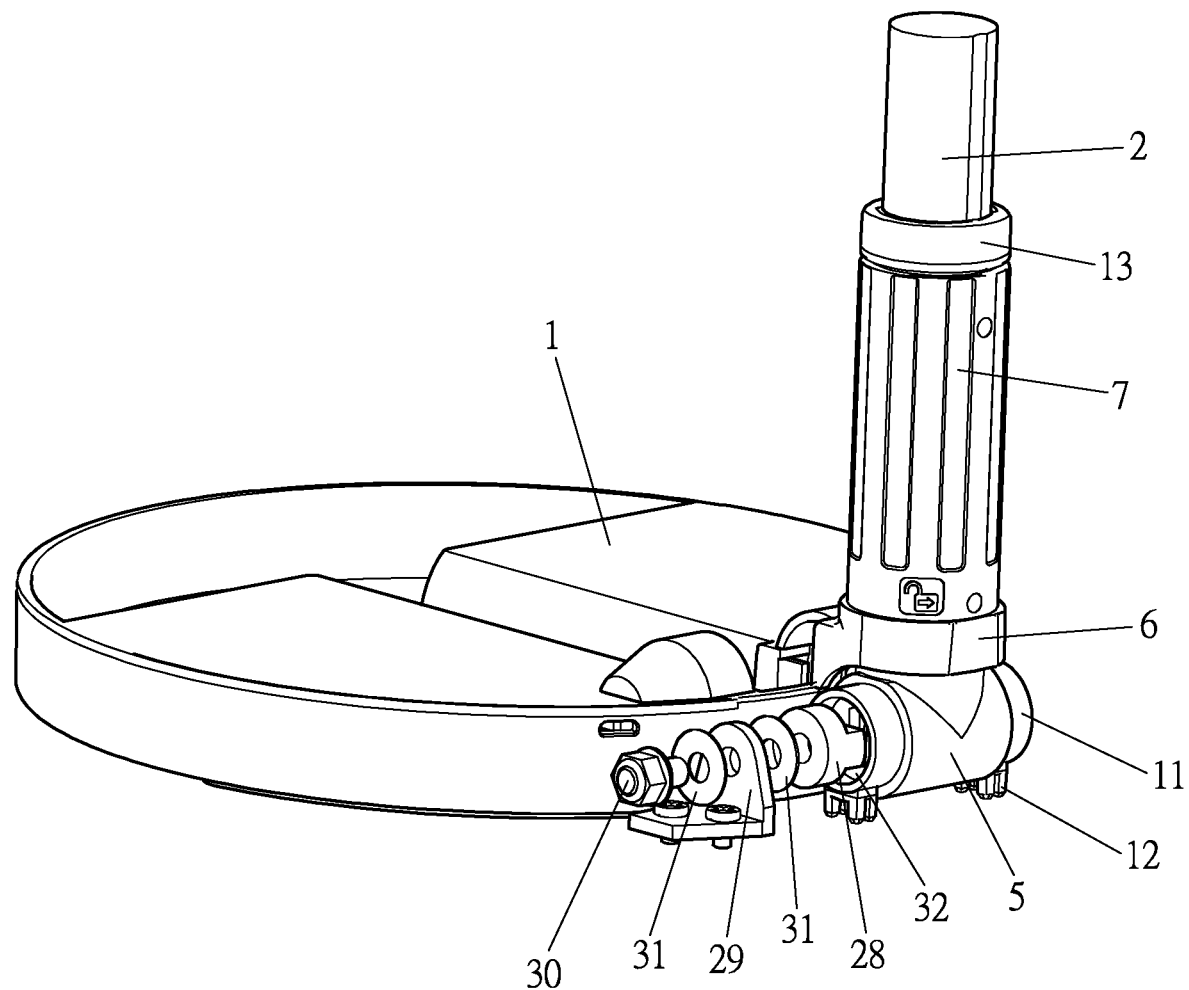
FIG. 12 is an exploded view of Embodiment 3.
Figure 13:
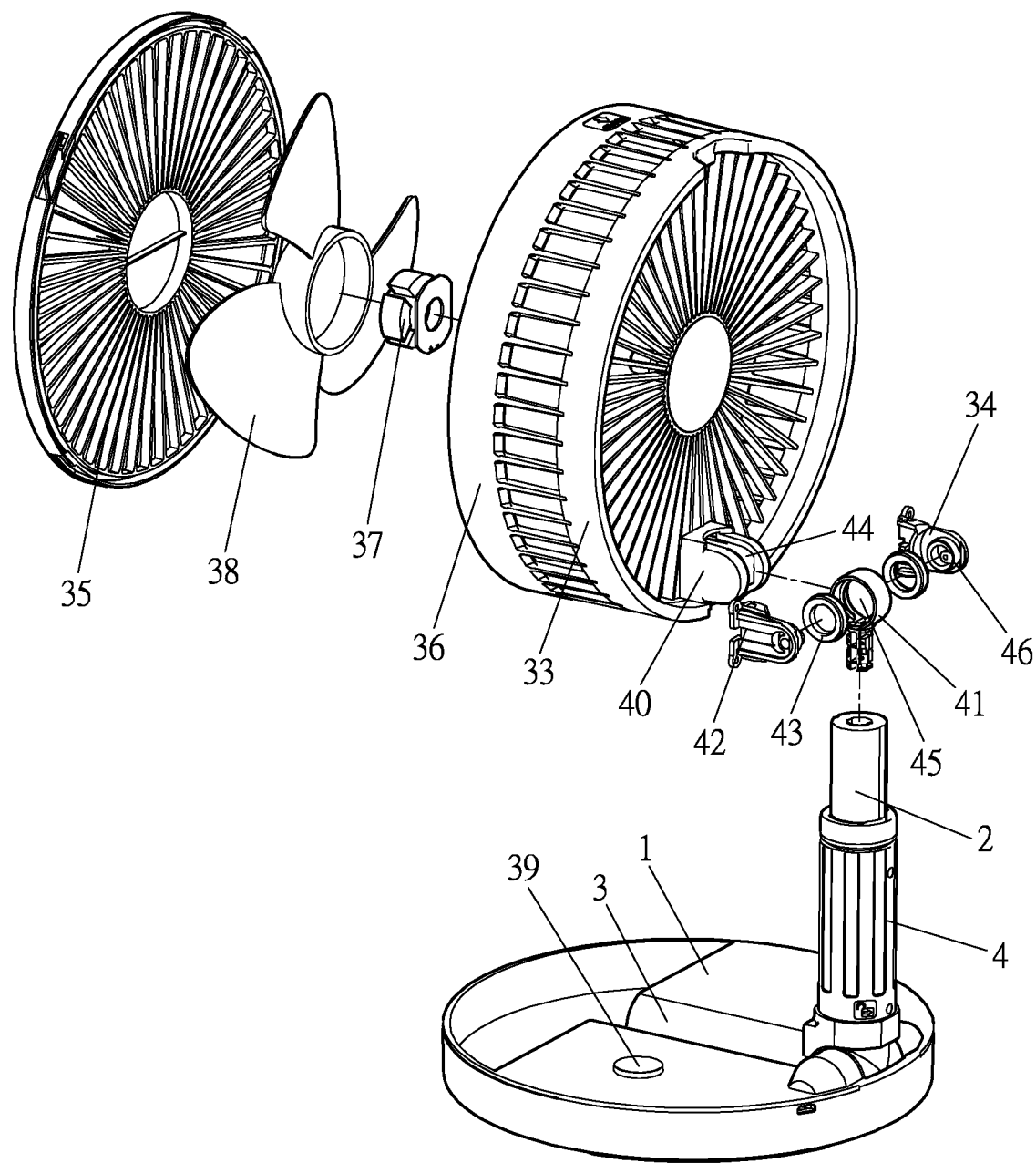
FIG. 13 is a schematic view showing the overall structure of Embodiment 4.
Figure 14:
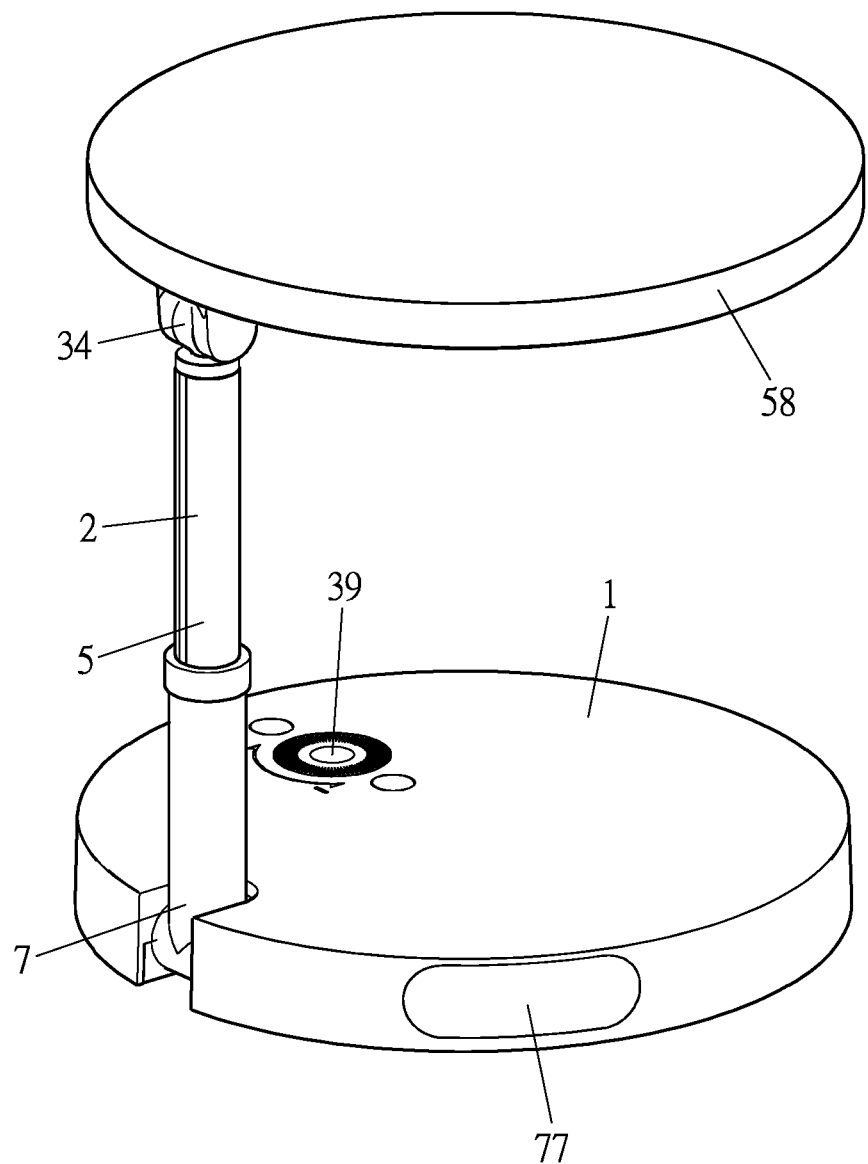
FIG. 14 is a schematic diagram of a first overall structure of Embodiment 6.
Figure 15:
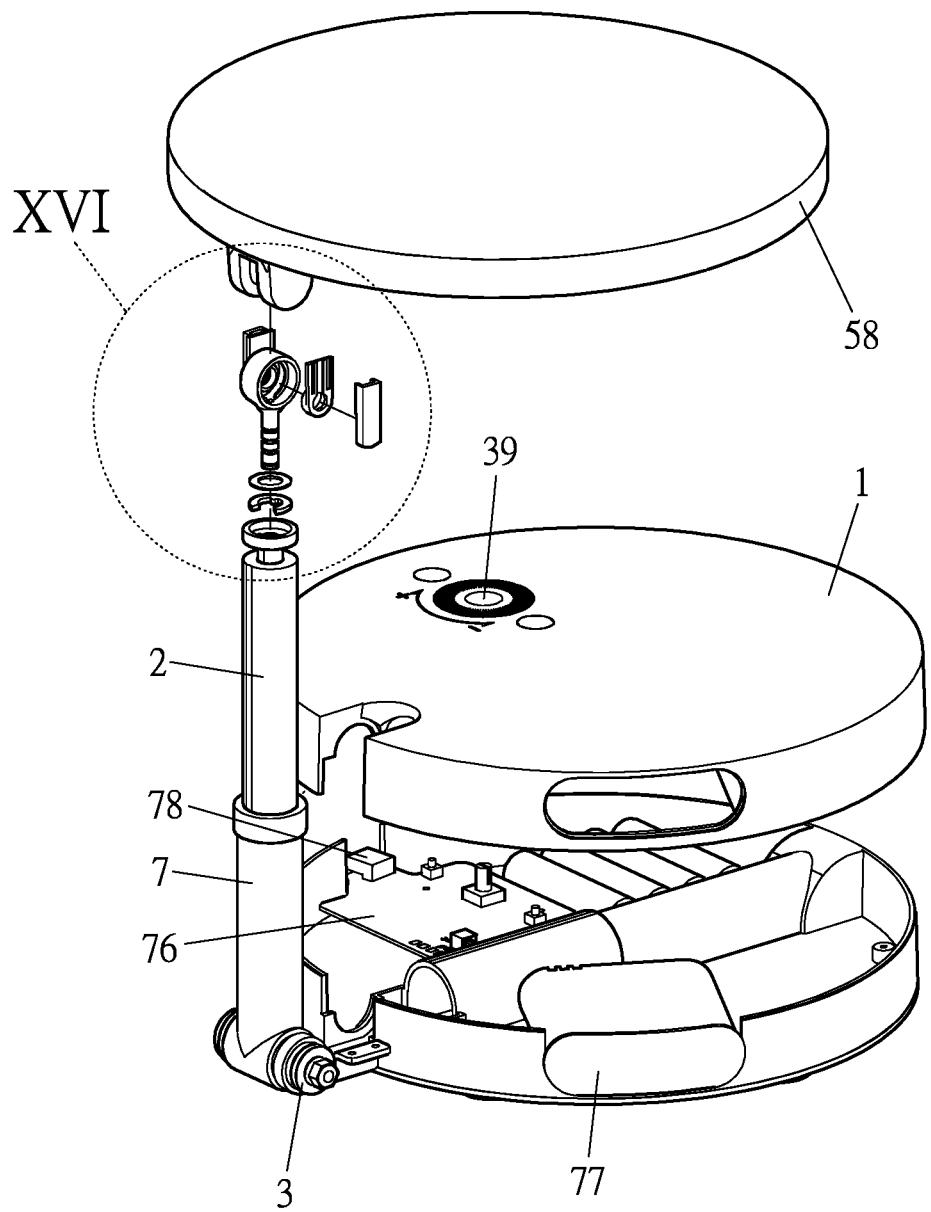
FIG. 15 is an exploded view of the overall structure of Embodiment 6.
Figure 16:
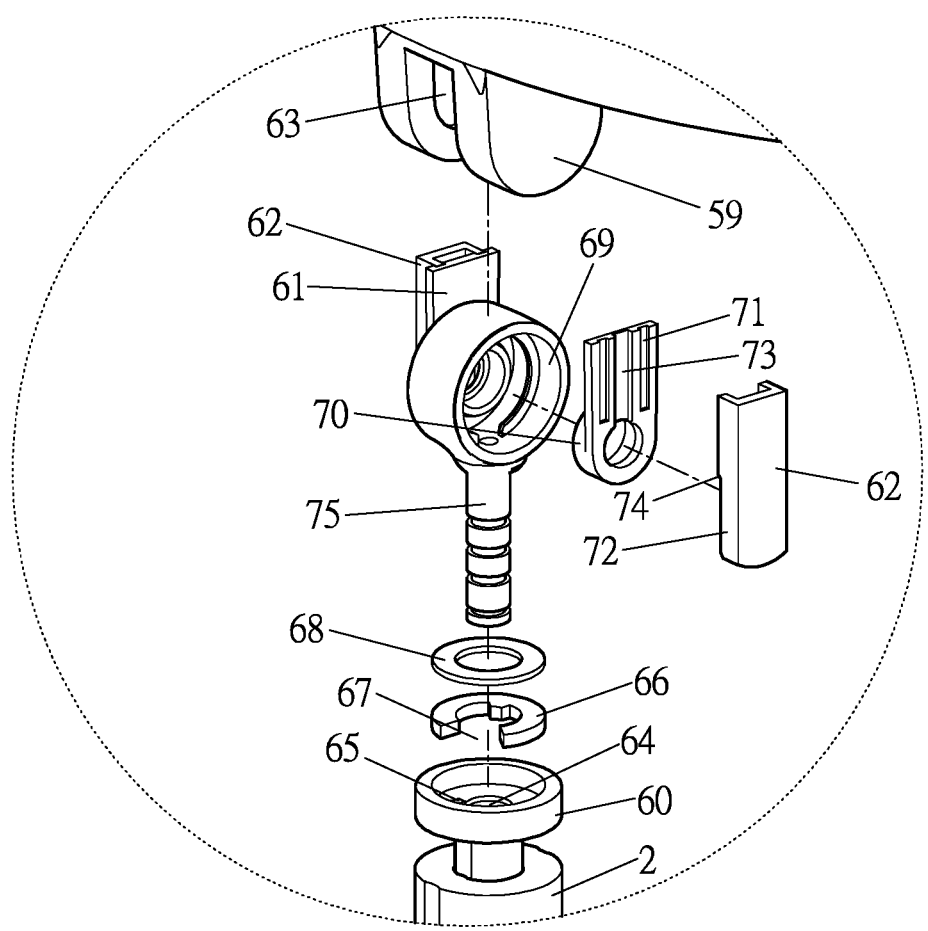
FIG. 16 is an enlarged view corresponding to detail XVI in FIG. 15.
Figure 17:
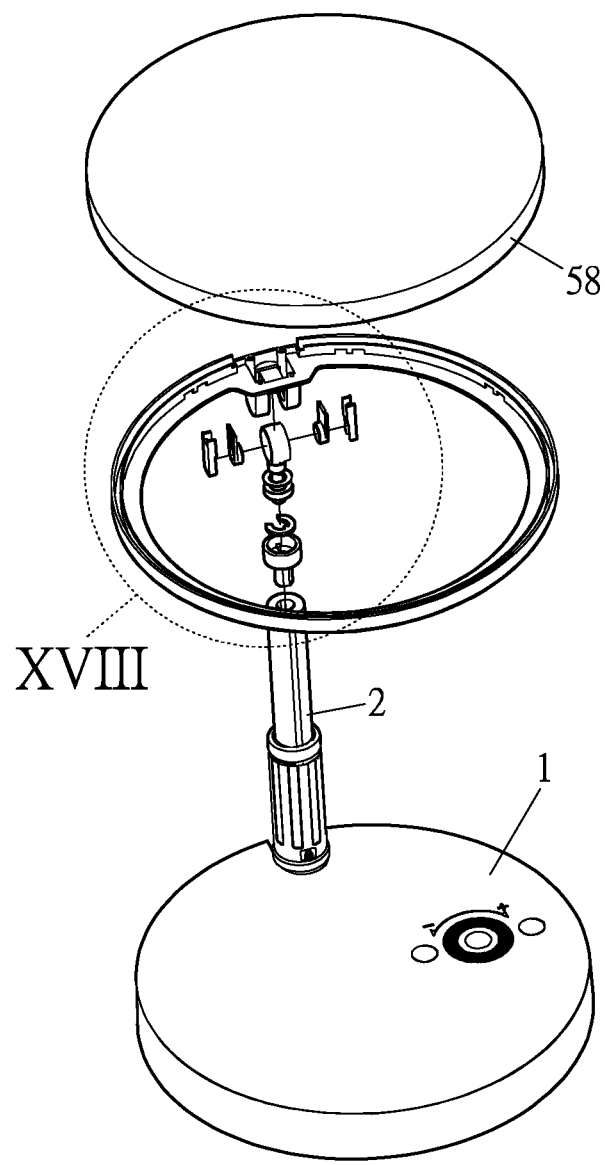
FIG. 17 is a schematic diagram of a second overall structure of Embodiment 6.
Figure 18:
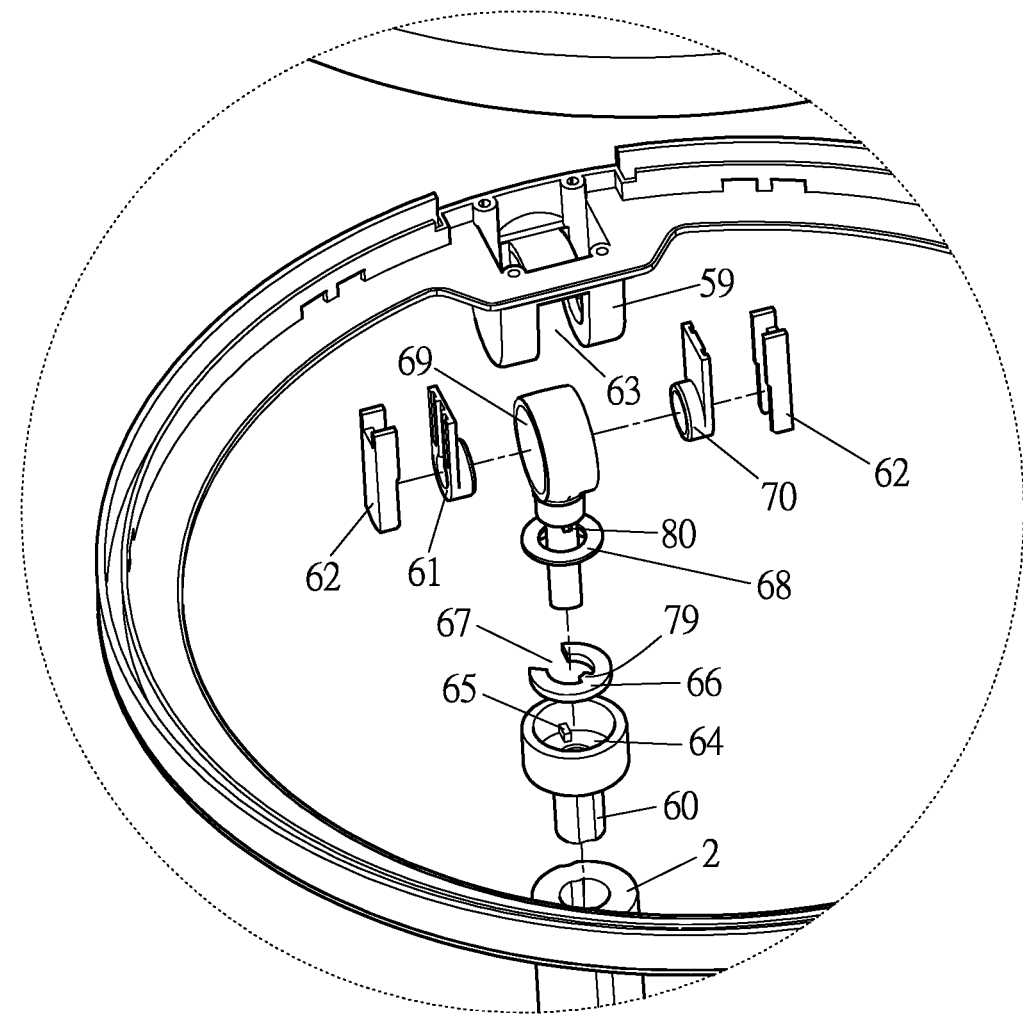
FIG. 18 is an enlarged view corresponding to detail XVIII in FIG. 17.

Specifically, as shown in FIG. 9-11, the insertion groove 48 is disposed on the rotating shaft 11. The insertion assembly 47 includes a fixing block 49, an insertion board 50, a shifting block 51, and an elastic member 52. The fixing block 49 is fixedly assembled with a top case. The insertion board 50 is mounted on the bottom cover and located on one side of the bottom cover close to the rotating shaft 11. The insertion board 50 is slidable relative to the bottom cover to be inserted into or separated from the insertion groove 48. The shifting block 51 is fixedly assembled with the insertion board 50 through the top case, and the shifting block 51 is used to drive the insertion board 50 to be separated from or inserted into the insertion groove 48. The elastic member 52 is disposed between the fixing block 49 and the insertion board 50, and the elastic member 52 is used to provide a restoring force for the resetting of the insertion board 50.

Preferably, a mounting table 53 is disposed on a side of the bottom cover adjacent to the rotating shaft 11, and the insertion plate 50 is provided with a waist-shaped groove 57. The fastening screw is assembled with the mounting table 53 through the waist-shaped groove 57, thereby realizing the sliding assembly between the insertion board 50 and the bottom cover.

Preferably, as shown in FIG. 9-11, a first boss 54 is disposed on a side of the fixing block 49 adjacent to the insertion board 50, and a second boss 55 is disposed on a side of the insertion board 50 adjacent to the fixing block 49. A circular hole is disposed between the first boss 54 and the second boss 55. One end of the elastic member 52 is mounted in the circular hole of the first boss 54 and the other end is fixedly mounted in the circular hole of the second boss 55. The elastic member 52 is a spring.

Preferably, the chassis 1 is provided with a mounting piece 56. A first mounting groove 27 is provided on one side of the mounting piece 56 close to the mounting table 53, and the fixing block 49 is mounted in the first mounting groove 27. The mounting piece 56 is integrally formed with the bottom cover, and the mounting table 53 and the bottom cover are also integrally formed.

Embodiment 4

The difference between this embodiment and Embodiment 1 and Embodiment 2 is mainly that, as shown in FIGS. 7 and 8, in the present embodiment, the locking mechanism 4 is a combination of Embodiment 1 and Embodiment 2. Such a locking mechanism 4 not only can effectively ensure the stability of the telescopic rod when it is fixed, but also can effectively improve the hand feeling of the foldable device when rotating the telescopic rod, thereby improving the user experience.

Embodiment 5

The embodiment relates to a foldable fan. As shown in FIGS. 1-9, the foldable fan includes a foldable device, a fan main body 33, and a flip-locking mechanism 34.

The foldable device is any one of the Embodiment 1, Embodiment 2, and Embodiment 3. The fan main body 33 is disposed on one side of the foldable device away from the chassis 1. One end of the flip-locking mechanism 34 is fitted to the fan main body 33, and the other end is fitted to one side of the foldable device away from the chassis 1. When the fan main body 33 is used, the flip-locking mechanism 34 is used to achieve locking between the fan main body 33 and the foldable device; and when the fan main body 33 is received, the flip-locking mechanism 34 is used to achieve the rotation between the fan main body 33 and the foldable device.

Specifically, the fan main body 33 includes a cover 35, a rear cover 36, a motor 37, and a fan blade 38. The cover 35 and the rear cover 36 are closed to form a storage cavity for storing the motor 37 and the fan blade 38. The motor 37 is fixed in the rear cover 36, and the fan blade 38 is fixedly connected to an output shaft of the motor 37. The fan main body 33 partially belongs to the prior art and is not the focus of the present disclosure, and is not exhaustively described herein.

Preferably, the chassis 1 is provided with an operation button 39. The end surface of the chassis 1 on which the operation button 39 is disposed is an operation surface, and the receiving groove 3 is disposed on the operation surface. When the fan main body 33 is folded, the telescopic locking mechanism 4 and the reverse locking mechanism 34 are folded and received in the receiving groove 3.

Further, the flip-locking mechanism 34 includes a first connecting base 40, a first gimbal head 40, a hinge member 42 and a damping rubber ring 43.

The first connecting base 40 is fixedly mounted to the back of the fan main body 33. The first gimbal head 41 is fixedly mounted on one side of the telescopic locking mechanism 4 away from the chassis 1, and the first gimbal head 41 is used for assembling with the first connecting base 40. One end of the hinge member 42 is assembled with the first connecting base 40 and the other end is assembled with the first gimbal head 41, and the hinge member 42 is used to achieve the rotational assembly between the first gimbal head 41 and the first connecting base 40. The damping rubber ring 43 is disposed between the hinge member 42 and the first gimbal head 41, and the damping rubber ring 43 is used to achieve locking after the fan main body 33 is flipped over.

Specifically, the first connecting base 40 is provided with a notch 44 of a "⊏" type structure. The hinge member 42 is provided with two and the two hinge members 42 are respectively mounted on the opposite inner wall faces of the notches 44. One end of the first gimbal head 41 is annular and hinged between the two hinge members 42, and the other end is fixedly assembled with the telescopic locking mechanism 4.

Among them, the damping rubber ring 43 is disposed at the hinge joint of the first gimbal head 41 and the two hinge members 42. A circular through hole 45 is defined in the upper end of the first gimbal head 41. The two hinge members 42 are provided with circular protrusions 46 on the side of the circular through hole 45, and the two circular protrusions 46 are in one-to-one correspondence with the circular through holes 45. The damping rubber ring 43 is interposed between the outer wall surface of the circular boss 46 and the inner wall surface of the circular through hole 45, and is an interference fit. That is, the two damper rubber rings 43 are provided to increase the radial friction of the first gimbal head 41 relative to the rotation of the two hinge members 42, thereby ensuring that the fan main body 33 can maintain the rotated state after the rotation.

When the fan main body 33 is received, the fan main body 33 can be horizontally folded by flipping over the locking mechanism 34, and when the fan main body 33 is opened, the fan main body 33 can be flipped over on the first gimbal head 40 by the first connecting base 40 connected thereto, and the air supply angle of the fan main body 33 is adjusted by the damper rubber ring 43, so that the function of adjusting the fan main body 33 at multiple angles is realized.

With the above technical solution, by providing the flip-locking mechanism 34 on the fan main body 33, the fan main body 33 can realize the function of flipping over and folding and multi-angle adjustment by means of the flip-locking mechanism 34. Further, the fan main body 33 is also connected to the telescopic locking mechanism 4, and the telescopic locking mechanism 4 can realize the telescopic locking function. The present disclosure has a simple and compact structure, the fan body 33 can be folded and received on the chassis 1 by flipping over the flip-locking mechanism 34 and the telescopic locking mechanism 4, and the fan shape is small after folding, which does not occupy space, and is easy to receive and convenient to carry.

Embodiment 6

The embodiment relates to a new type of table lamp. As shown in FIGS. 14-18, the table lamp includes a table lamp main body 58, a flip-lock mechanism 34, and a foldable device.

As shown in FIGS. 14-18, the table lamp main body 58 is disposed on one side of the chassis 1 and can be folded and received on one side of the chassis 1. One end of the flip-lock mechanism 34 is assembled with the table lamp main body 58, and the other end is assembled with the telescopic end of the telescopic mechanism 2. When the table lamp main body 58 is used, the flip-lock mechanism 34 is used to lock the telescopic mechanism 2 and the table lamp main body 58; or when the table lamp main body 58 is received, the flip-lock mechanism 34 is used to implement the rotation between the table lamp main body 58 and the telescopic mechanism 2.

It should be noted that, when the foldable table lamp is used, the end surface of the chassis 1 close to the side of the carrier carrying the foldable table lamp is the bottom surface. The foldable device is as described in any one of Embodiment 1, Embodiment 2, Embodiment 3, and Embodiment 4. The foldable device used in this embodiment is the foldable device as described in Embodiment 1.

Specifically, as shown in FIGS. 14-18, an adjustment key for adjusting the brightness of the table lamp main body 58 is provided on the top case. The chassis 1 further includes a circuit board 76 and a mobile power source 77. The circuit board 76 is disposed on the bottom cover, and a power socket 78 is provided on a side wall of the bottom cover and the top case. The power socket 78 is used for receiving a power port on the circuit board 76. The mobile power source 77 is electrically connected to the circuit board 76 through the top case and the bottom cover, so that the foldable table lamp supplies power to the table lamp main body 58 when the power socket 78 is not connected, and the mobile power source 77 is detachably mounted on the chassis 1.

Further, as shown in FIGS. 14-18, the flip-and-lock mechanism 4 includes a second connection base 59, a mounting base 60, a second gimbal head 75, a mounting chuck 61, and a compaction block 62.

The second connection base 59 is disposed on the side of the table lamp main body 58 close to the telescopic rod, and the second connection base 59 is provided with a mounting cavity and a mounting gap 63. The mounting base 60 is disposed on the telescopic end of the telescopic rod and is fixedly assembled with the telescopic rod. A circular hole 64 is provided on the mounting base 60 along the axial direction of the telescopic rod. One end of the second gimbal head 75 is inserted into the circular hole 64 and can be damped and rotated relative to the telescopic rod. One end of the second gimbal head 75 is inserted in the mounting gap 63 and rotatable opposite to the second connection base 59. The mounting chuck 61 is disposed in the mounting cavity and damped and assembled with the second gimbal head 75. The compaction block 62 is inserted into the mounting cavity, and is used to fix the mounting chuck 61 and protect conducting wires.

Preferably, as shown in FIGS. 14-18, the second gimbal head 75 is damped and assembled in the circular hole 64. A first limiting block 65 is provided in the circular hole 64, and a limiting ring 66 assembled with the first limiting block 65 is provided on a side of the second gimbal head 75 close to the circular hole 64. A yielding slot 67 is provided on the limiting ring 66, and is used to cooperate with the first limiting block 65. A limiting boss 79 is protruded on an inner ring of the limiting ring 66, and a second limiting block 80 is provided on the second gimbal head 75. The second limiting block 80 is used to cooperate with the limiting boss 79 to achieve the limit position between the second gimbal head 75 and the limiting ring 66. The mounting base 60 is provided with a sealing ring 68. The sealing ring 68 is used for assembling with the first mounting groove 27, so as to fix the limiting ring 66 in the circular hole 64. When the second gimbal head 75 rotates relative to the telescopic rod, the cooperation of the first limiting block 65 and the limiting ring 66 and the cooperation of the second limiting block 80 and the limiting boss 79 can effectively prevent the second gimbal head 75 from rotating excessively, so as to protect spring wire installed in the telescopic rod.

Specifically, as shown in FIGS. 14-18, the second gimbal head 75 and the mounting chuck 61 are each provided with a through-hole, and the through-hole is used to receive a conducting wire. The second connecting base 59 is formed integrally with the case of the table lamp main body, two mounting chucks 61 are provided and two compaction blocks 62 are correspondingly provided. A mounting hole 69 is provide at one end of the second gimbal head 75 which is assembled with the second connection base 59, and a mounting portion 70 is protruded from a side of the mounting chuck 61 close to the mounting hole 69, and is damped and assembled with the mounting hole 69.

Preferably, a sliding groove 71 is provided on a side of the mounting chuck 61 close to the compaction block 62, and the compaction block 62 is provided with a sliding rail 72, which is used for assembling with the sliding groove 71, thereby facilitating assembly of the compaction block 62. Two sliding grooves 71 are provided, and two sliding rails 72 are correspondingly provided. In addition, in order to facilitate the accommodating of the power supply wires between the compaction block 62 and the mounting chuck 61, a wire groove 73 is provided on the mounting clamp 61, and the wire groove 73 is located between the two sliding grooves 71. A ladder structure 74 with a wedge-shaped surface is provided at the middle position of the two sliding rails 72, and the ladder structure 74 facilitates the abutting assembly between the compaction block 62 and the mounting chuck 61.

The above is only the description of the technical solutions of the present disclosure, and the other modifications and equivalents of the technical solutions of the present disclosure should be included in the spirit and scope of the technical solutions of the present disclosure. Within the scope of the claims of the present disclosure.

What is claimed is:

1. A foldable device, comprising: a chassis (1) configured to support an electronic device or a small electric device; and a telescopic mechanism (2) of which one end is assembled with the chassis (1) and the other end is assembled with an electronic device or a small electric device; wherein the telescopic mechanism (2) is telescoped to adjust the support height during use, and the telescopic mechanism (2) is retractably received in the chassis (1) during receiving;

wherein the chassis (1) is provided with a receiving groove (3), the telescopic mechanism (2) is rotatably mounted in the receiving groove (3), and a locking mechanism (4) is disposed between the telescopic mechanism (2) and the receiving groove (3); the locking mechanism (4) is configured to lock the telescopic mechanism (2) with the chassis (1) when the telescopic mechanism (2) is used; when the telescopic mechanism (2) is received, the locking mechanism (4) releases the lock between the telescopic mechanism (2) and the chassis (1), and after unlocking, the telescopic mechanism (2) is inverted with respect to the chassis (1) and received in the receiving groove (3);

wherein the telescopic mechanism (2) comprises an inner sleeve (5), and a hinge end of the inner sleeve (5) is hinged to one end of the receiving groove (3) and rotatably assembled with the chassis (1);

wherein the locking mechanism (4) comprises an outer sleeve (7) sleeved on the inner sleeve (5) and rotatable relative to the inner sleeve (5) to lock or unlock the inner sleeve (5) and the chassis (1).

2. The foldable device according to claim 1, wherein the receiving groove (3) is disposed on a bottom surface of the chassis (1), and/or on the electronic device or the small electric device; when the telescopic mechanism (2) is received, the telescopic mechanism (2) is flipped over the hinge end of the inner sleeve (5) to the receiving groove (3) of the bottom surface of the chassis (1) from the working state of the upper side of the chassis (1);

alternatively, the receiving groove (3) is disposed on a top surface of the chassis (1), and/or on the electronic device or the small electric device; when the telescopic mechanism (2) is received, the telescopic mechanism (2) is flipped over the hinge end of the inner sleeve (5) to the receiving groove (3) of the top surface of the chassis (1) from the working state of the upper side of the chassis (1).

3. The foldable device according to claim 2, wherein the telescopic mechanism (2) comprises:

a telescopic rod; wherein a fixed end of the telescopic rod is sleeved in and fixedly assembled with the inner sleeve (5) and a telescopic end of the telescopic rod is assembled with an electronic device or a small electric device.

4. The foldable device according to claim 3, wherein two sides of the hinge end of the inner sleeve (5) respectively extend outward to form a rotating shaft (11), and two of the rotating shafts (11) are disposed on the same axis; the chassis (1) is provided with an storage space (9), and an inner wall surface on one side of the storage space (9) is provided with a mounting boss (10); the mounting boss (10) is respectively provided with a mounting shaft hole (25) corresponding to the two rotating shafts (11), the size of the mounting shaft hole (25) is matched with the size of the two rotating shafts (11), and the two rotating shafts (11) are respectively inserted into the mounting shaft hole (25), so that the inner sleeve (5) is rotatably mounted on the mounting boss (10) through the rotating shaft (11).

5. The foldable device according to claim 4, wherein an outer circumference of the rotating shaft (11) is further provided with a damping pad (12) for increasing frictional force, and the damping pad (12) is interposed between the rotating shaft (11) and the mounting shaft hole (25) of the mounting boss (10).

6. The foldable device according to claim 4, wherein the locking mechanism (4) comprises:

a limiting structure (13) disposed between the inner sleeve (5) and the outer sleeve (7) for limiting a movement of the outer sleeve (7) on the inner sleeve (5).

7. The foldable device according to claim 6, wherein a locking member (6) is provided between the outer sleeve (7) and the chassis (1), and the locking member (6) is configured to increase the locking area between the outer sleeve (7) and the chassis (1) to improve the stability of the telescopic rod;

wherein when the outer sleeve (7) is rotated relative to the inner sleeve (5) and close to the chassis (1), the outer sleeve (7) abuts the locking member (6) against the chassis (1) to lock the inner sleeve (5); and wherein when the outer sleeve (7) is rotated relative to the inner sleeve (5) and away from the chassis (1), the outer sleeve (7) releases the abutment of the locking member (6) to unlock the inner sleeve (5).

8. The foldable device according to claim 7, wherein an outer surface of the inner sleeve (5) is provided with an external thread (8), an inner surface of the outer sleeve (7) is provided with a corresponding internal thread, and the outer sleeve (7) is locked and fixed to the inner sleeve (5) by a threaded structure cooperating with the inner sleeve (5).

9. The foldable device according to claim 8, wherein the limiting structure (13) comprises:

a holding ring (14); wherein the holding ring (14) is sleeved on one side of the inner sleeve (5) away from the hinge end, engaged with the inner sleeve (5) and provided with an opening (16); and a locking ring (15); wherein one part of the locking ring (15) is inserted into the inner sleeve (5) through the opening (16) of the holding ring (14) and the other part is engaged with the holding ring (14).

10. The foldable device according to claim 4, wherein the locking mechanism (4) comprises: a fixing head (28), a fixing piece (29), an adjusting piece (31), and an adjustment bolt (30);

wherein the rotating shaft (11) is provided with an assembling cavity (32), the fixing head (28) is fixedly fitted in the assembling cavity (32), and the fixing head (28) moves synchronously with the rotating shaft (11);

wherein one end of the fixing piece (29) is fixedly mounted on the chassis (1);

wherein the adjusting piece (31) is disposed between the fixing piece (29) and the fixing head (28), and/or between the fixing piece (29) and the adjusting bolt (30); and wherein the adjusting bolt (30) is assembled with the fixing piece (29) and the fixing head (28) through the adjusting piece (31), and is configured to adjust the frictional force between the fixing piece (29) and the fixing head (28).

11. The foldable device according to claim 4, wherein the chassis (1) comprises:

a top case and a bottom cover; wherein the bottom cover is assembled with the top case, the hinge end of the inner sleeve (5) is provided with an insertion groove (48), the locking mechanism (4) is an insertion assembly (47) disposed on the chassis (1) and slidable relative to the chassis (1), the insertion assembly (47) is configured to cooperate with the insertion groove (48) to fix the hinge end, thereby maintaining the telescopic rod and the chassis (1) to be relatively fixed; wherein the insertion groove (48) is disposed on the rotating shaft (11), and the insertion assembly (47) comprises:

a fixing block (49) fixedly assembled with the top case;

an insertion board (50) mounted on the bottom cover and located on the bottom cover adjacent to one side of the rotating shaft (11), and slidable relative to the bottom cover to be inserted or separated from the insertion groove (48);

a shifting block (51) fixedly mounted on the insertion board (50) through the top case and configured to drive the insertion board (50) to be separated or inserted from the insertion groove (48); and an elastic member (52) disposed between the fixing block (49) and the insertion board (50) and configured to provide a restoring force for resetting the insertion board (50).

12. A foldable fan, comprising:
a foldable device according to claim 1;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

13. A foldable fan, comprising:
a foldable device according to claim 2;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

14. A foldable fan, comprising:
a foldable device according to claim 3;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

15. A foldable fan, comprising:
a foldable device according to claim 4;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

16. A foldable fan, comprising:
a foldable device according to claim 5;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

17. A foldable fan, comprising:
a foldable device according to claim 6;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

18. A foldable fan, comprising:
a foldable device according to claim 7;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

19. A foldable fan, comprising:
a foldable device according to claim 8;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

20. A foldable fan, comprising:
a foldable device according to claim 9;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

21. A foldable fan, comprising:
a foldable device according to claim 10;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

22. A foldable fan, comprising:
a foldable device according to claim 11;
a fan main body (33) disposed on a side of the foldable device away from the chassis (1); and
a flip-locking mechanism (34) of which one end is assembled with the fan main body (33) and the other end is mounted on a side of the foldable device away from the chassis (1); wherein when the fan main body (33) is used, the flip-locking mechanism (34) is configured to achieve locking between the fan main body (33) and the foldable device, or when the fan main body (33) is received, the flip-locking mechanism (34) is configured to implement the rotation between the fan main body (33) and the foldable device.

23. The foldable fan according to claim 12, wherein the flip-locking mechanism (34) comprises:
a first connecting base (40) fixedly mounted on the fan main body (33);
a first gimbal head (41) fixedly mounted on one side of the telescopic locking mechanism (4) away from the chassis (1) and configured to assemble with the first connecting base (40);
a hinge member (42) of which one end is assembled with the first connecting base (40) and the other end is assembled with the first gimbal head (41) for realizing a rotational assembly between the first gimbal head (41) and the first connecting base (40); and
a damping rubber ring (43) disposed between the hinge member (42) and the first gimbal head (41).

24. The foldable fan according to claim 13, wherein the flip-locking mechanism (34) comprises:
a first connecting base (40) fixedly mounted on the fan main body (33);
a first gimbal head (41) fixedly mounted on one side of the locking mechanism (4) away from the chassis (1) and configured to assemble with the first connecting base (40);
a hinge member (42) of which one end is assembled with the first connecting base (40) and the other end is assembled with the first gimbal head (41) for realizing a rotational assembly between the first gimbal head (41) and the first connecting base (40); and
a damping rubber ring (43) disposed between the hinge member (42) and the first gimbal head (41).

25. The foldable fan according to claim 14, wherein the flip-locking mechanism (34) comprises:
a first connecting base (40) fixedly mounted on the fan main body (33);
a first gimbal head (41) fixedly mounted on one side of the locking mechanism (4) away from the chassis (1) and configured to assemble with the first connecting base (40);
a hinge member (42) of which one end is assembled with the first connecting base (40) and the other end is assembled with the first gimbal head (41) for realizing a rotational assembly between the first gimbal head (41) and the first connecting base (40); and
a damping rubber ring (43) disposed between the hinge member (42) and the first gimbal head (41).

26. The foldable fan according to claim 15, wherein the flip-locking mechanism (34) comprises:
a first connecting base (40) fixedly mounted on the fan main body (33);
a first gimbal head (41) fixedly mounted on one side of the telescopic locking mechanism (4) away from the chassis (1) and configured to assemble with the first connecting base (40);
a hinge member (42) of which one end is assembled with the first connecting base (40) and the other end is assembled with the first gimbal head (41) for realizing a rotational assembly between the first gimbal head (41) and the first connecting base (40); and
a damping rubber ring (43) disposed between the hinge member (42) and the first gimbal head (41).

27. The foldable fan according to claim 16, wherein the flip-locking mechanism (34) comprises:
a first connecting base (40) fixedly mounted on the fan main body (33);
a first gimbal head (41) fixedly mounted on one side of the telescopic locking mechanism (4) away from the chassis (1) and configured to assemble with the first connecting base (40);
a hinge member (42) of which one end is assembled with the first connecting base (40) and the other end is assembled with the first gimbal head (41) for realizing a rotational assembly between the first gimbal head (41) and the first connecting base (40); and
a damping rubber ring (43) disposed between the hinge member (42) and the first gimbal head (41).

28. The foldable fan according to claim 17, wherein the flip-locking mechanism (34) comprises:
a first connecting base (40) fixedly mounted on the fan main body (33);
a first gimbal head (41) fixedly mounted on one side of the telescopic locking mechanism (4) away from the chassis (1) and configured to assemble with the first connecting base (40);
a hinge member (42) of which one end is assembled with the first connecting base (40) and the other end is assembled with the first gimbal head (41) for realizing a rotational assembly between the first gimbal head (41) and the first connecting base (40); and a damping rubber ring (43) disposed between the hinge member (42) and the first gimbal head (41).

29. The foldable fan according to claim 18, wherein the flip-locking mechanism (34) comprises:
    a first connecting base (40) fixedly mounted on the fan main body (33);
    a first gimbal head (41) fixedly mounted on one side of the telescopic locking mechanism (4) away from the chassis (1) and configured to assemble with the first connecting base (40);
    a hinge member (42) of which one end is assembled with the first connecting base (40) and the other end is assembled with the first gimbal head (41) for realizing a rotational assembly between the first gimbal head (41) and the first connecting base (40); and
    a damping rubber ring (43) disposed between the hinge member (42) and the first gimbal head (41).

30. The foldable fan according to claim 19, wherein the flip-locking mechanism (34) comprises:
    a first connecting base (40) fixedly mounted on the fan main body (33);
    a first gimbal head (41) fixedly mounted on one side of the locking mechanism (4) away from the chassis (1) and configured to assemble with the first connecting base (40);
    a hinge member (42) of which one end is assembled with the first connecting base (40) and the other end is assembled with the first gimbal head (41) for realizing a rotational assembly between the first gimbal head (41) and the first connecting base (40); and
    a damping rubber ring (43) disposed between the hinge member (42) and the first gimbal head (41).

31. The foldable fan according to claim 20, wherein the flip-locking mechanism (34) comprises:
    a first connecting base (40) fixedly mounted on the fan main body (33);
    a first gimbal head (41) fixedly mounted on one side of the locking mechanism (4) away from the chassis (1) and configured to assemble with the first connecting base (40);
    a hinge member (42) of which one end is assembled with the first connecting base (40) and the other end is assembled with the first gimbal head (41) for realizing a rotational assembly between the first gimbal head (41) and the first connecting base (40); and
    a damping rubber ring (43) disposed between the hinge member (42) and the first gimbal head (41).

32. The foldable fan according to claim 21, wherein the flip-locking mechanism (34) comprises:
    a first connecting base (40) fixedly mounted on the fan main body (33);
    a first gimbal head (41) fixedly mounted on one side of the locking mechanism (4) away from the chassis (1) and configured to assemble with the first connecting base (40);
    a hinge member (42) of which one end is assembled with the first connecting base (40) and the other end is assembled with the first gimbal head (41) for realizing a rotational assembly between the first gimbal head (41) and the first connecting base (40); and
    a damping rubber ring (43) disposed between the hinge member (42) and the first gimbal head (41).

33. The foldable fan according to claim 22, wherein the flip-locking mechanism (34) comprises:
    a first connecting base (40) fixedly mounted on the fan main body (33);
    a first gimbal head (41) fixedly mounted on one side of the telescopic locking mechanism (4) away from the chassis (1) and configured to assemble with the first connecting base (40);
    a hinge member (42) of which one end is assembled with the first connecting base (40) and the other end is assembled with the first gimbal head (41) for realizing a rotational assembly between the first gimbal head (41) and the first connecting base (40); and
    a damping rubber ring (43) disposed between the hinge member (42) and the first gimbal head (41).

34. The foldable fan according to claim 23, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

35. The foldable fan according to claim 24, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

36. The foldable fan according to claim 25, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

37. The foldable fan according to claim 26, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

38. The foldable fan according to claim 27, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

39. The foldable fan according to claim 28, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

40. The foldable fan according to claim 29, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

41. The foldable fan according to claim 30, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

42. The foldable fan according to claim 31, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

43. The foldable fan according to claim 32, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

44. The foldable fan according to claim 33, wherein the first connecting base (40) is provided with a notch (44) of a "⊏" type structure, two hinge members (42) are provided and are respectively mounted on opposite inner wall surfaces of the notch (44), one end of the first gimbal head (41) has an annular shape and is hinged to the two hinge members (42), and the other end of the first gimbal head (41) is fixedly assembled with the locking mechanism (4); and when the fan main body (33) is received, the fan main body (33) is flipped over and folded relative to the locking mechanism (4) by the first gimbal head (41).

45. A foldable table lamp, comprising:
a foldable device according to claim 1;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

46. A foldable table lamp, comprising:
a foldable device according to claim 2;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

47. A foldable table lamp, comprising:
a foldable device according to claim 3;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

48. A foldable table lamp, comprising:
a foldable device according to claim 4;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

49. A foldable table lamp, comprising:
a foldable device according to claim 5;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

50. A foldable table lamp, comprising:
a foldable device according to claim 6;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

51. A foldable table lamp, comprising:
a foldable device according to claim 7;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between the a fan main body (33) and the telescopic end, or when the table lamp main body (58) is received, the flip-locking mechanism (34) is configured to implement the rotation between the table lamp main body (58) and the telescopic end.

52. A foldable table lamp, comprising:
a foldable device according to claim 8;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

53. A foldable table lamp, comprising:
a foldable device according to claim 9;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

54. A foldable table lamp, comprising:
a foldable device according to claim 10;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

55. A foldable table lamp, comprising:
a foldable device according to claim 11;
a table lamp main body (58) provided on one side of the foldable device, wherein the table lamp main body (58) is foldable and received on one side of the foldable device; and
a flip-locking mechanism (34) of which one end is assembled with the table lamp main body (58) and the other end is mounted on a telescopic end, wherein when the table lamp main body (58) is used, the flip-locking mechanism (34) is configured to achieve locking between a fan main body (33) and the telescopic end, or when the table lamp main body (58) is received, the flip-locking mechanism (34) is configured to implement the rotation between the table lamp main body (58) and the telescopic end.

56. The foldable table lamp according to claim 45, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
a mounting base (60) provided at the telescopic end of the telescopic rod and fixedly assembled with the telescopic rod, wherein a circular hole (64) is provided on the mounting base (60) along the axial direction of the telescopic rod;
a second gimbal head (75) of which one end is inserted into the circular hole (64) and damped and rotatable relative to the telescopic rod and the other end is inserted into the mounting gap (63) and damped and rotatable opposite to the second connecting base (59);
a mounting chuck (61) provided in the mounting cavity and damped and assembled with the second gimbal head (75); and a compaction block (62) inserted into the mounting cavity and configured to fix the mounting clamp (61) and protect conducting wires.

57. The foldable table lamp according to claim 46, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
- a mounting base (60) provided at the telescopic end of the telescopic rod and fixedly assembled with the telescopic rod, wherein a circular hole (64) is provided on the mounting base (60) along the axial direction of the telescopic rod;
- a second gimbal head (75) of which one end is inserted into the circular hole (64) and damped and rotatable relative to the telescopic rod and the other end is inserted into the mounting gap (63) and damped and rotatable opposite to the second connecting base (59);
- a mounting chuck (61) provided in the mounting cavity and damped and assembled with the second gimbal head (75); and
- a compaction block (62) inserted into the mounting cavity and configured to fix the mounting clamp (61) and protect conducting wires.

58. The foldable table lamp according to claim 47, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
- a mounting base (60) provided at the telescopic end of the telescopic rod and fixedly assembled with the telescopic rod, wherein a circular hole (64) is provided on the mounting base (60) along the axial direction of the telescopic rod;
- a second gimbal head (75) of which one end is inserted into the circular hole (64) and damped and rotatable relative to the telescopic rod and the other end is inserted into the mounting gap (63) and damped and rotatable opposite to the second connecting base (59);
- a mounting chuck (61) provided in the mounting cavity and damped and assembled with the second gimbal head (75); and
- a compaction block (62) inserted into the mounting cavity and configured to fix the mounting clamp (61) and protect conducting wires.

59. The foldable table lamp according to claim 48, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
- a mounting base (60) provided at the telescopic end of the telescopic rod and fixedly assembled with the telescopic rod, wherein a circular hole (64) is provided on the mounting base (60) along the axial direction of the telescopic rod;
- a second gimbal head (75) of which one end is inserted into the circular hole (64) and damped and rotatable relative to the telescopic rod and the other end is inserted into the mounting gap (63) and damped and rotatable opposite to the second connecting base (59);
- a mounting chuck (61) provided in the mounting cavity and damped and assembled with the second gimbal head (75); and
- a compaction block (62) inserted into the mounting cavity and configured to fix the mounting clamp (61) and protect conducting wires.

60. The foldable table lamp according to claim 49, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
- a mounting base (60) provided at the telescopic end of the telescopic rod and fixedly assembled with the telescopic rod, wherein a circular hole (64) is provided on the mounting base (60) along the axial direction of the telescopic rod;
- a second gimbal head (75) of which one end is inserted into the circular hole (64) and damped and rotatable relative to the telescopic rod and the other end is inserted into the mounting gap (63) and damped and rotatable opposite to the second connecting base (59);
- a mounting chuck (61) provided in the mounting cavity and damped and assembled with the second gimbal head (75); and
- a compaction block (62) inserted into the mounting cavity and configured to fix the mounting clamp (61) and protect conducting wires.

61. The foldable table lamp according to claim 50, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
- a mounting base (60) provided at the telescopic end of the telescopic rod and fixedly assembled with the telescopic rod, wherein a circular hole (64) is provided on the mounting base (60) along the axial direction of the telescopic rod;
- a second gimbal head (75) of which one end is inserted into the circular hole (64) and damped and rotatable relative to the telescopic rod and the other end is inserted into the mounting gap (63) and damped and rotatable opposite to the second connecting base (59);
- a mounting chuck (61) provided in the mounting cavity and damped and assembled with the second gimbal head (75); and
- a compaction block (62) inserted into the mounting cavity and configured to fix the mounting clamp (61) and protect conducting wires.

62. The foldable table lamp according to claim 51, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
- a mounting base (60) provided at the telescopic end of the telescopic rod and fixedly assembled with the telescopic rod, wherein a circular hole (64) is provided on the mounting base (60) along the axial direction of the telescopic rod;
- a second gimbal head (75) of which one end is inserted into the circular hole (64) and damped and rotatable relative to the telescopic rod and the other end is inserted into the mounting gap (63) and damped and rotatable opposite to the second connecting base (59);
- a mounting chuck (61) provided in the mounting cavity and damped and assembled with the second gimbal head (75); and a compaction block (62) inserted into the mounting cavity and configured to fix the mounting clamp (61) and protect conducting wires.

63. The foldable table lamp according to claim 52, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
   a mounting base (60) provided at the telescopic end of the telescopic rod and fixedly assembled with the telescopic rod, wherein a circular hole (64) is provided on the mounting base (60) along the axial direction of the telescopic rod;
   a second gimbal head (75) of which one end is inserted into the circular hole (64) and damped and rotatable relative to the telescopic rod and the other end is inserted into the mounting gap (63) and damped and rotatable opposite to the second connecting base (59);
   a mounting chuck (61) provided in the mounting cavity and damped and assembled with the second gimbal head (75); and
   a compaction block (62) inserted into the mounting cavity and configured to fix the mounting clamp (61) and protect conducting wires.

64. The foldable table lamp according to claim 53, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
   a mounting base (60) provided at the telescopic end of the telescopic rod and fixedly assembled with the telescopic rod, wherein a circular hole (64) is provided on the mounting base (60) along the axial direction of the telescopic rod;
   a second gimbal head (75) of which one end is inserted into the circular hole (64) and damped and rotatable relative to the telescopic rod and the other end is inserted into the mounting gap (63) and damped and rotatable opposite to the second connecting base (59);
   a mounting chuck (61) provided in the mounting cavity and damped and assembled with the second gimbal head (75); and
   a compaction block (62) inserted into the mounting cavity and configured to fix the mounting clamp (61) and protect conducting wires.

65. The foldable table lamp according to claim 54, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
   a mounting base (60) provided at the telescopic end of the telescopic rod and fixedly assembled with the telescopic rod, wherein a circular hole (64) is provided on the mounting base (60) along the axial direction of the telescopic rod;
   a second gimbal head (75) of which one end is inserted into the circular hole (64) and damped and rotatable relative to the telescopic rod and the other end is inserted into the mounting gap (63) and damped and rotatable opposite to the second connecting base (59);
   a mounting chuck (61) provided in the mounting cavity and damped and assembled with the second gimbal head (75); and
   a compaction block (62) inserted into the mounting cavity and configured to fix the mounting clamp (61) and protect conducting wires.

66. The foldable table lamp according to claim 55, wherein the flip-lock mechanism (34) comprises: a second connecting base (59) mounted on one side of the table lamp main body (58) close to the telescopic rod, wherein a mounting cavity and a mounting gap (63) are provided on the second connecting base (59);
   a mounting base (60) provided at the telescopic end of the telescopic rod and fixedly assembled with the telescopic rod, wherein a circular hole (64) is provided on the mounting base (60) along the axial direction of the telescopic rod;
   a second gimbal head (75) of which one end is inserted into the circular hole (64) and damped and rotatable relative to the telescopic rod and the other end is inserted into the mounting gap (63) and damped and rotatable opposite to the second connecting base (59);
   a mounting chuck (61) provided in the mounting cavity and damped and assembled with the second gimbal head (75); and
   a compaction block (62) inserted into the mounting cavity and configured to fix the mounting clamp (61) and protect conducting wires.

67. The foldable table lamp according to claim 56, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
   wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
   wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

68. The foldable table lamp according to claim 57, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
   wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
   wherein when the second gimbal head (75) rotates relative to the telescopic rod, the cooperation of the first limiting block (65) and the limiting ring (66) and the cooperation of the second limiting block and the limiting boss effectively prevent the second gimbal head

(75) from rotating excessively, so as to protect spring wire installed in the telescopic rod.

69. The foldable table lamp according to claim 58, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
    wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
    wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

70. The foldable table lamp according to claim 59, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
    wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
    wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

71. The foldable table lamp according to claim 60, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
    wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
    wherein when the second gimbal head (75) rotates relative to the telescopic rod, the cooperation of the first limiting block (65) and the limiting ring (66) and the cooperation of the second limiting block and the limiting boss effectively prevent the second gimbal head 72. The foldable table lamp according to claim 61, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
    wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
    wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

73. The foldable table lamp according to claim 62, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
    wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
    wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

74. The foldable table lamp according to claim 63, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65),
    wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and
    wherein when the second gimbal head (75) rotates relative to the telescopic rod, the cooperation of the first limiting block (65) and the limiting ring (66) and the cooperation of the second limiting block and the limiting boss effectively prevent the second gimbal head

(75) from rotating excessively, so as to protect spring wire installed in the telescopic rod.

75. The foldable table lamp according to claim 64, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65), wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

76. The foldable table lamp according to claim 65, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65), wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

77. The foldable table lamp according to claim 66, wherein the circular hole (64) is configured to damp the second gimbal head (75), a first limiting block (65) is provided in the circular hole (64), a side of the second gimbal head (75) close to the circular hole (64) is provided with a limiting ring (66) assembled with the first limiting block (65), a yielding slot is provided on the limiting ring (66) and configured to cooperate with the first limiting block (65), wherein a limiting boss is protruded on an inner ring of the limiting ring (66), a second limiting block is arranged on the second gimbal head (75), the second limiting block is configured to cooperate with the limiting boss to achieve a limit position between the second gimbal head (75) and the limiting ring (66), and wherein when the second gimbal head (75) rotates relative to the telescopic rod, the cooperation of the first limiting block (65) and the limiting ring (66) and the cooperation of the second limiting block and the limiting boss effectively prevent the second gimbal head (75) from rotating excessively, so as to protect spring wire installed in the telescopic rod.

\* \* \* \* \*